(12) United States Patent
Robinson et al.

(10) Patent No.: US 9,019,155 B2
(45) Date of Patent: Apr. 28, 2015

(54) GLOBAL POSITIONING SYSTEM (GPS) AND DOPPLER AUGMENTATION (GDAUG) AND SPACE LOCATION INERTIAL NAVIGATION GEOPOSITIONING SYSTEM (SPACELINGS)

(75) Inventors: Ian S. Robinson, Redondo Beach, CA (US); Mark Skidmore, Long Beach, CA (US)

(73) Assignee: Raytheon Company, Waltham, MA (US)

( * ) Notice: Subject to any disclaimer, the term of this patent is extended or adjusted under 35 U.S.C. 154(b) by 443 days.

(21) Appl. No.: 13/463,566

(22) Filed: May 3, 2012

(65) Prior Publication Data

US 2013/0293414 A1  Nov. 7, 2013

(51) Int. Cl.
 *H04B 7/185* (2006.01)
 *G01S 19/05* (2010.01)
 *G01S 19/11* (2010.01)
 *G01S 19/42* (2010.01)

(52) U.S. Cl.
 CPC .................. *G01S 19/05* (2013.01); *G01S 19/11* (2013.01); *G01S 19/42* (2013.01)

(58) Field of Classification Search
 USPC ....................... 342/353, 357.395, 357.48, 453
 See application file for complete search history.

(56) References Cited

U.S. PATENT DOCUMENTS

| | | | |
|---|---|---|---|
| 5,570,096 A | 10/1996 | Knight | |
| 5,760,738 A | 6/1998 | Kawano | |
| 6,020,847 A | 2/2000 | Upton et al. | |
| 6,031,489 A | 2/2000 | Wyrwas et al. | |
| 6,107,959 A | 8/2000 | Levanon | |
| 6,147,644 A * | 11/2000 | Castles et al. | 342/367 |
| 6,307,503 B1 | 10/2001 | Liu | |
| 7,372,400 B2 * | 5/2008 | Cohen et al. | 342/357.29 |
| 8,019,541 B2 * | 9/2011 | Cohen et al. | 701/474 |
| 8,711,033 B2 * | 4/2014 | Calmettes et al. | 342/353 |
| 2011/0144911 A1 | 6/2011 | Madhavan et al. | |
| 2011/0254730 A1 | 10/2011 | McBurney | |

FOREIGN PATENT DOCUMENTS

| | | |
|---|---|---|
| EP | 0844492 A1 | 5/1998 |
| EP | 0856957 A2 | 8/1998 |
| WO | WO 99/40692 | 8/1999 |
| WO | WO 0052495 | 9/2000 |
| WO | WO 2011/075707 A1 | 6/2011 |

OTHER PUBLICATIONS

Anonymous; Doris; https://noppa.aalto.fi/noppa/kurssi/maa-6.3272/luennot/maa-6_3272_doris.pdf ; Upon information and belief, available prior to May 3, 2012; 4 pages.

(Continued)

*Primary Examiner* — Harry Liu

(57) ABSTRACT

A global positioning system (GPS) and Doppler augmentation (GDAUG) end receiver (GDER) can include a GDAUG module. The GDAUG module can generate a GDER position using a time of flight (TOF) of a transponded GPS signal and a Doppler shift in a GDAUG satellite (GSAT) signal. The transponded GPS signal sent from a GSAT to the GDER can include a frequency shifted copy of a GPS signal from a GPS satellite to the GSAT. The GSAT signal can include a signal generated by the GSAT to the GDER.

14 Claims, 17 Drawing Sheets

(56) References Cited

OTHER PUBLICATIONS

Boehme; Miniature Analog GOS Translator for Trident Reentry Body Accuracy Analysis; Johns Hopkins APL Technical Digest; 2010; pp. 133-140; vol. 29, No. 2.
Stewart; Evolution of Military GPS; 21 pages; (the inventor believes that this was publicly available sufficiently earlier than the effective US filing date and any foreign priority date).
U.S. Appl. No. 13/536,809, filed Jun. 28, 2012; Ian Robinson.
U.S. Appl. No. 13/463,522, filed May 3, 2012; Ian Robinson.
PCT/US2013/028715; filed Mar. 1, 2013; Raytheon Company; International Search Report dated Jul. 6, 2013.
PCT/US2013/038503; filed Apr. 26, 2013; Raytheon Company; international search report dated Nov. 28, 2013.
PCT/US2013/028709; filed Mar. 1, 2013; Raytheon Copmpany; international search report dated Dec. 18, 2013.
McCaskill et al; Doppler Only Navigation Using the Timation II Satellite [Unclassified Title], NRL Report 7657; Dec. 3, 1973; 32 pages.
Boehme; Miniature Analog GPS Translator for Trident Reentry Body Accuracy Analysis; Johns Hopkins APL Technical Digest; 2010; pp. 133-140; vol. 29, No. 2.
Levesque et al; Performance Issues Concerning Doppler-Only Localization of Submarine Targets; Saclantcen Report, serial No. SR-325; Jul. 2000; 49 pages.
Lemoine et al; Three Decades of Precision Orbit Determination and its Vital Role to Oceanography; Jun. 19, 2008; 23 pages.
Stewart; Evolution of Military GPS; 21 pages; (the inventor believes that this was publicly available sufficiently earlier than the effective US filing date and any foreign priority date), Jun. 12, 1991.
Vetter; Fifty Years of Orbit Determination: Development of Modern Astrodynamics Methods; Johns Hopkins Apl Technical Digest; 2007; pp. 239-252; vol. 27, No. 3.
Jayles et al; Ten Centimeters Orbits in Real-Time On-Board of a Satellite: DORIS-DIODE Current Status; Acta Astronautica; 2004; pp. 315-323; vol. 54.
Brunet et al; Doris Precise Orbit Determination and Localization System Description and USO's Performances; 1995 IEEE International Frequency Control Symposium; pp. 122-132.
U.S. Appl. No. 13/463,522, Ian Robinson, filed May 3, 2012.
U.S. Appl. No. 13/536,809, filed Jun. 28, 2012; Ian s. Robinson; office action dated Oct. 23, 2014, 2012.
U.S. Appl. No. 13/536,809; filed Jun. 28, 2012; Ian S. Robinson; Notice of Allowance mailed Feb. 17, 2015.

* cited by examiner

1000

Generating a global position using a time of flight (TOF) and a Doppler shift of transponded pseudo-random noise (PRN) signals on a common frequency carrier, wherein the transponded PRN signals sent from a SPACELINGS satellite (SLS) to the SER comprises a frequency shifted copy of at least two downlink PRN signals from a high altitude satellite (HAS) to the SLS using at least two different frequency carriers from the common frequency carrier.

GLOBAL POSITIONING SYSTEM (GPS) AND DOPPLER AUGMENTATION (GDAUG) AND SPACE LOCATION INERTIAL NAVIGATION GEOPOSITIONING SYSTEM (SPACELINGS)

BACKGROUND

Satellite navigation systems, such as a global positioning system (GPS), enable a receiver to determine a location from ranging signals received from a plurality of satellites. The GPS can include three major segments: a space segment (SS), a control segment (CS), and a user segment (US). The United States Air Force develops, maintains, and operates the space and control segments. GPS satellites broadcast signals from space, and each GPS receiver uses these signals to calculate a three-dimensional location (latitude, longitude, and altitude) of the GPS receiver and a current time at each GPS satellite. The space segment can include 24 to 32 satellites in a medium Earth orbit (MEO). The control segment can include a master control station, an alternate master control station, and a host of dedicated and shared ground antennas and monitor stations. The user segment can include military, civil, commercial, and scientific users.

SUMMARY OF EXEMPLARY EMBODIMENTS

The ranging signals can be broadcasted on frequencies, such as the L1 signal (1.57542 gigahertz (GHz)) and/or L2 signal (1.2276 GHz). Position can be determined from matching codes in the transmitted signal and the receiver to determine the difference in time between transmission and reception. A code division multiple access (CDMA) code is transmitted by the GPS satellites to the receiver and correlated with replica codes to determine ranges to different satellites, which can be used to determine the position of a GPS receiver on or near the Earth. Generally, a GPS receiver receives signals from multiple GPS satellites (e.g., four) to find its position.

In some exemplary embodiments, a global positioning system (GPS) and Doppler augmentation (GDAUG) end receiver (GDER) can be provided, which can comprise a GDAUG module, wherein the GDAUG module can generate a GDER position using a time of flight (TOF, the difference in time between transmission and reception) of a transponded GPS signal and a Doppler shift in a GDAUG satellite (GSAT) signal, and wherein the transponded GPS signal sent from a GSAT to the GDER can comprise a frequency shifted copy of a GPS signal from a GPS satellite to the GSAT, and the GSAT signal can comprise a signal generated by the GSAT to the GDER.

The GDAUG module can further comprise a Doppler shift module that measures a Doppler shift in the GSAT signal, a GSAT ephemeris estimator that can determine a GSAT position by measuring a trend in a plurality of GSAT Doppler shift measurements from a plurality of GSAT signals, and a range estimator that can calculate a GSAT range from the GSAT position and a super-range measurement of the transponded GPS signal, wherein the super-range measurement can represent a distance from the GPS to the GDER via the GSAT. A receiver location estimator that can estimate a GDER position using the GSAT position and the GSAT range may also be included in the GDAUG module.

The Doppler shift module can measure a Doppler shift in the transponded GPS signal, and the GSAT ephemeris estimator can determine the GSAT position by extracting the Doppler shift due to the GSAT range from the Doppler shift of the transponded GPS signal to generate a Doppler shift of the GPS signal and by estimating the GSAT position using the Doppler shift of the GPS signal.

An exemplary method for global positioning using a global positioning system (GPS) and Doppler augmentation (GDAUG) end receiver (GDER) can also provided, which method can comprise generating a GDER position using a time of flight (TOF) of a transponded GPS signal and a Doppler shift in a GDAUG satellite (GSAT) signal, wherein the transponded GPS signal sent from a GSAT to the GDER can comprise a frequency shifted copy of a GPS signal from a GPS satellite to the GSAT, and the GSAT signal can comprise a signal generated by the GSAT to the GDER.

Generating the GDER position can further comprise generating a super-range measurement from the transponded GPS signal, wherein the super-range measurement can represent a distance from the GPS to the GDER via the GSAT, measuring a Doppler shift in the GSAT signal, determining a GSAT position by measuring a trend in a plurality of GSAT Doppler shift measurements from a plurality of GSAT signals, calculating a GSAT range from the GSAT position and the super-range measurement of the transponded GPS signal, and estimating a GDER position using the GSAT position and the GSAT range.

A computer program product can also be provided, which computer program product can comprise a non-transitory computer readable storage medium having a computer readable program code embodied therein, the computer readable program code being adapted to be executed to implement the method discussed above.

A global positioning system (GPS) and Doppler augmentation (GDAUG) satellite (GSAT) can also be provided, which can comprise a GPS signal receiver for receiving a GPS signal, a frequency shifter for generating a transponded GPS signal from the GPS signal using a GSAT frequency band substantially different from a GPS signal frequency band, a signal generator for generating a GSAT signal, and a signal transmitter for transmitting the transponded GPS signal and the GSAT signal to a GDAUG end receiver (GDER).

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein:

FIG. 9 depicts a flow chart of a method for global positioning using a space location inertial navigation geopositioning system (SPACELINGS) end receiver (SER) with at least two downlink PRN signals from a high altitude satellite (HAS) in accordance with an example;

Figure 1:
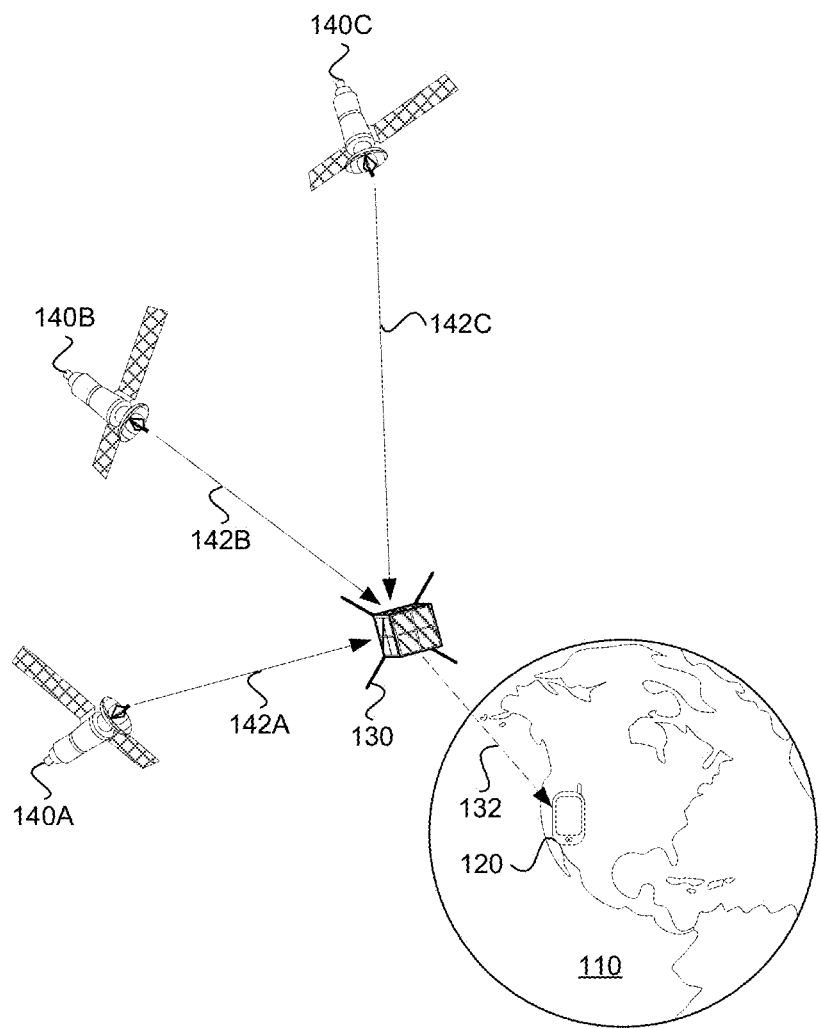
FIG. 1 illustrates a diagram of a plurality of global positioning system (GPS) satellites, a GPS and Doppler augmentation (GDAUG) satellite (GSAT), and a GDAUG end receiver (GDER) in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

The global positioning system (GPS) is a space-based global navigation satellite system (GNSS) that can provide location and time information in various types of weather, anywhere on or near the Earth, where a GPS receiver has an unobstructed line of sight to four or more GPS satellites. When a GPS satellite is blocked from the GPS receiver so too few GPS satellites are in view of the GPS receiver, the GPS receiver can provide no positioning information or it can generate inaccurate or incorrect positioning information. Alternatively, the GPS signal on known GPS frequencies may be jammed by an external jamming source or other electronic equipment preventing the GPS receiver from receiving a valid GPS signal. Alternatively, an external spoofing source may generate a false GPS signal on known GPS frequencies in an attempt to spoof the GPS receiver to generate inaccurate or incorrect positioning information.

FIG. 1 illustrates a segment of a GPS and Doppler augmentation (GDAUG) satellite (GSAT) system, which can be used to provide GPS-type position accuracy to an end receiver using frequency shifted copies of GPS signals 142A-C relayed through a GSAT 130, referred to as transponded GPS signals or symbolically represented by a S1 signal. A transponded signal can be frequency shifted copy of an original signal transponded from a different location. A repeated signal can be a copy of the original signal repeated from the different location. In some embodiments, the transponded signal can include the repeated signal, but generally the transponded signal is a frequency shifted copy of the original signal. The GPS signals can include the L1 and/or the L2 signals. The GSAT can generate a S1 signal for either the L1 or L2 GPS signal received. The end receiver capable of receiving GSAT signals can be referred to as a GDAUG end receiver (GDER) 120. The GDER can be on or near the Earth 110. The GDER can measure the time difference between the generation of the signal by a GPS and the reception of S1 to generate a super-range measurement representing the distance from a GPS satellite 140A-C to the GDER via the GSAT (or a GPS-to-GSAT-to-GDER range). The L1, L2, and/or S1 can include a pseudo-random noise code (PRN or PN code), which includes a time the L1 or L2 signal was generated by the GPS. The super-range measurement can include a time of flight (TOF) of the L1 or L2 signal plus the TOF of the S1 signal. The GDER can also measure the Doppler shift of S1, which can have a Doppler shift contribution from the transmission from GPS to GSAT and GSAT to GDER.

A super-range can include two legs of a "bent pipe" that can include a GPS-to-GSAT range, represented by the TOF of L1 or L2 142A-C, and a GSAT-to-GDER range, represented by the TOF of S1 132. The S1 signal, which can be a copy or a frequency shifted copy of the L1 or L2 signal, can encode the position of the GPS satellites. The GDER can receive the S1 signal and determine the time elapsed between the signal origin and the receiver's time. The GDER can also read the encoded GPS position information.

The GSAT can also generate a GSAT signal, such as a tone, that can be used to determine the Doppler shift due to the GSAT-to-GDER path. The tone can be a sinusoidal wave at specified frequency. The GSAT signal can be symbolically represented by a S2 signal. The S1 signal and the S2 signal can be transmitted 132 from the GSAT to the GDER. Measuring a trend in Doppler shift of the S2 signal can allow the GDER to determine the ephemeris of the GSAT. Having information on the ephemeris of the GSAT, the GDER can determine the distances of the two legs of the super-range, and accordingly the range from GSAT to GDER. The range may have some error if a timing offset between the GPS time on a GPS satellite clock and a clock used by the GDER occurs. The ephemeris can include a table various information, such as the positions or orbits of a heavenly body (e.g., a satellite) on a number of dates and times in a regular sequence. Although three GPS satellites are shown in FIG. 1, the GSAT location and the GDER location may be determined with one GPS satellite in some scenarios.

The carrier frequencies of the S1 and S2 signals may be selected to minimize and avoid jammed portions of the spectrum. The GDER can continue to measure range from GSAT and can measure and trend over time the Doppler shift in S1 due to the transmission from GSAT to GDER. The range and Doppler trend data from one or more GSATs can be used by the GDER to estimate the GDER's three dimensional (3-D) position.

The GDER utilizing the GDAUG system can enable users to navigate when GPS signals are jammed or spoofed, and can provide positioning assistance to a user that is not in view of a sufficient number of GPS satellites. The GDAUG system can also add precision to the existing GPS.

In another example, the GDER can use range measurements (including a super-range measurement generated from a TOF of a transponded GPS signal) and Doppler measurements to estimate the GDER's position. The Doppler measurements can be trended over time. To obtain range measurements, the GDER can decode the contents of a GPS signal transponded by a GSAT. Decoding the transponded GPS signal can reveal a position of the GPS that originated the GPS signal and can provide a psuedo-random noise (PRN) signal from which a super-range (or distance from the GPS satellite to the GSAT, then to the GDER) can be estimated. To obtain a range (including the GSAT-to-GDER range and the GPS-to-GSAT range) from the super-range, the GDER can estimate an ephemeris (or orbit) of the GSAT and subtract (or otherwise remove) the GSAT ephemeris component of range from the super-range. The S2 signal can enable the receiver to estimate the ephemeris of the GSAT. The S2 signal can also help separate the Doppler shift measured on the S1 signal into a part due to transmission from the GPS satellite to GSAT and a part due to transmission from the GSAT to GDER. The Doppler shift of the part of the S1 signal due to transmission from the GPS satellite to GSAT can also be used to help estimate the ephemeris of the GSAT. The combination of Doppler shift of the S1 due to transmission from GSAT to GDER and the range measurements from GSAT to GDER can enable the GDER to estimate the GDER' position.

Some errors in the system can occur due to clock offsets/bias between the GDER clock and the GPS satellite clocks. The biases can be resolved over time due to a moving position of the GSAT, in one aspect, and/or by an altitude sensor or barometric sensor in another aspect.

Although not to be limiting in any way, the GSATs in the GDAUG system can be a CUBESAT or other similar type of small or inexpensive type satellite. The CUBESAT can be a type of miniaturized satellite. In one embodiment, the CUBESAT can comprise a volume of approximately a liter (10 centimeter (cm) cube) with a weight less than 5 kilograms, and preferably less than 2 kilograms (kg). The CUBESAT can use commercial off-the-shelf electronics components. The GSAT can include functions, such a power source or a power generation mechanism, a mechanism to control heating and cooling of the satellite, and/or a mechanism to point a transmitter or antenna to the Earth. The power generation mechanism can include solar cells or panels. The power source can include a battery or capacitive device. The mechanism to control the heating and cooling of the satellite may control the heating and cooling of the satellite passively, so the mechanism does not require a power source to function properly. The mechanism to point the transmitter or antenna to the Earth may steer or rotate the position of the satellite passively.

Each GSAT can act as a bend in a "bent pipe" between a GPS satellite and the GDER and can provide a transponder relay of the GPS signals. The transponder can detect the analog radio frequency (RF) signals received by the GPS satellite, shift the frequency of the signal to a more favorable and/or unjammed frequency, and transmit the frequency shifted GPS signal (S1 signal). In another example, the GSAT can provide frequency hopping of the S1 signal.

Figure 2A:
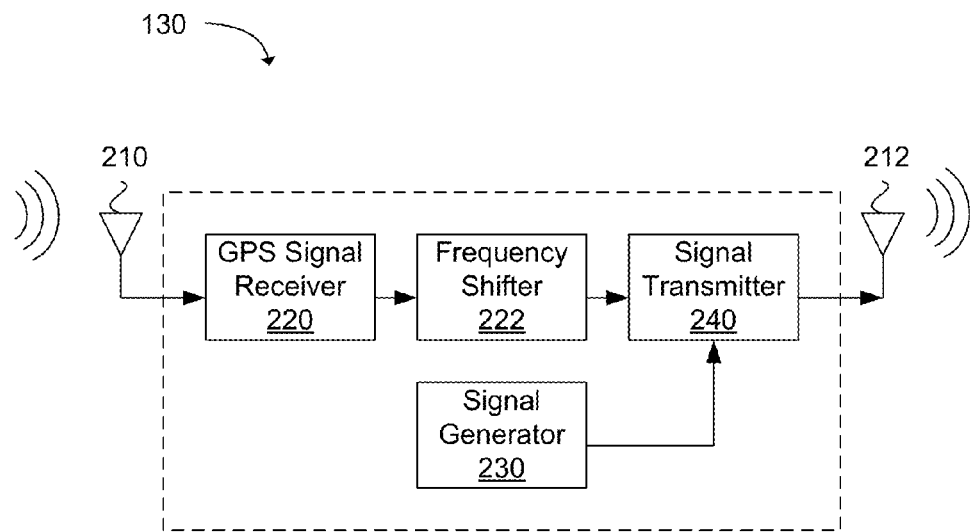
FIG. 2A illustrates a block diagram of a global positioning system (GPS) and Doppler augmentation (GDAUG) satellite (GSAT) in accordance with an example.
Figure 2B:
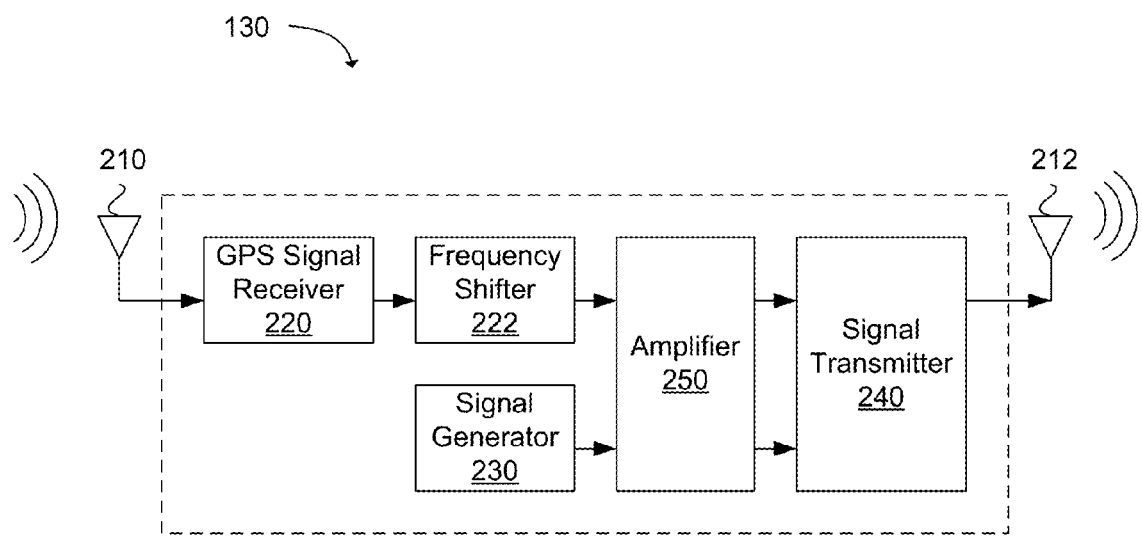
FIG. 2B illustrates a block diagram of a global positioning system (GPS) and Doppler augmentation (GDAUG) satellite (GSAT) with an amplifier in accordance with an example.

As illustrated in FIG. 2A, the GSAT 130 can include at least one receiving antenna 210, a GPS signal receiver 220 (GPS receiver) for receiving a GPS signal (or plurality of GPS signals), a frequency shifter 222 for generating the S1 signal from the GPS signal (L1 or L2), a signal generator 230 for generating the S2 signal, at least one transmitting antenna 212, and/or a signal transmitter 240 for transmitting the S1 signal and/or the S2 signal to the GDER. The S1 signal and/or the S2 signal can be transmitted to the GDER in a simplex transmission. The simplex transmission is one-way communication or communication that occurs in one direction only (in contrast to duplex transmission or two-way communication). The transmitting antenna can be a wide angle antenna to cover the Earth from a low orbit. The antenna gain can be limited with a wide angle antenna. The receiving antenna and the transmitting antenna can be a single antenna or a duplex antenna as long as the antenna can both receive a GPS signal and transmit the S1 and S2 signals. The S1 signal and the S2 signals can use a GSAT frequency band substantially different from the GPS signal. A substantially different GSAT frequency band can be a band that is not a GPS frequency band received by a typical GPS receiver. GPS satellites transmit L1 GPS signals on a common set of frequency carriers and in the same frequency bands. Similarly, L2 signals can be transmitted on a different common carrier frequency. The S1 signals and the S2 signal can operate in a frequency band (the GSAT frequency band) between a very high frequency (VHF) band to a K-under ($K_u$) band. The VHF band is the radio frequency range from 30 megahertz (MHz) to 300 MHz, and the $K_u$ band is the radio frequency range from 10.95 gigahertz (GHZ) to 14.5 GHz or the band directly below the K-band. The K-band is the radio frequency range from 18 GHz to 27 GHz. The GSAT frequency band can include the VHF, an ultra high frequency (UHF), and portions of a super high frequency (SHF) band, such as the $K_u$ band. In another example illustrated in FIG. 2B, the GSAT can also include an amplifier 250 for amplifying the received GPS signal, the S1 signal, and/or the S2 signal.

Figure 3:
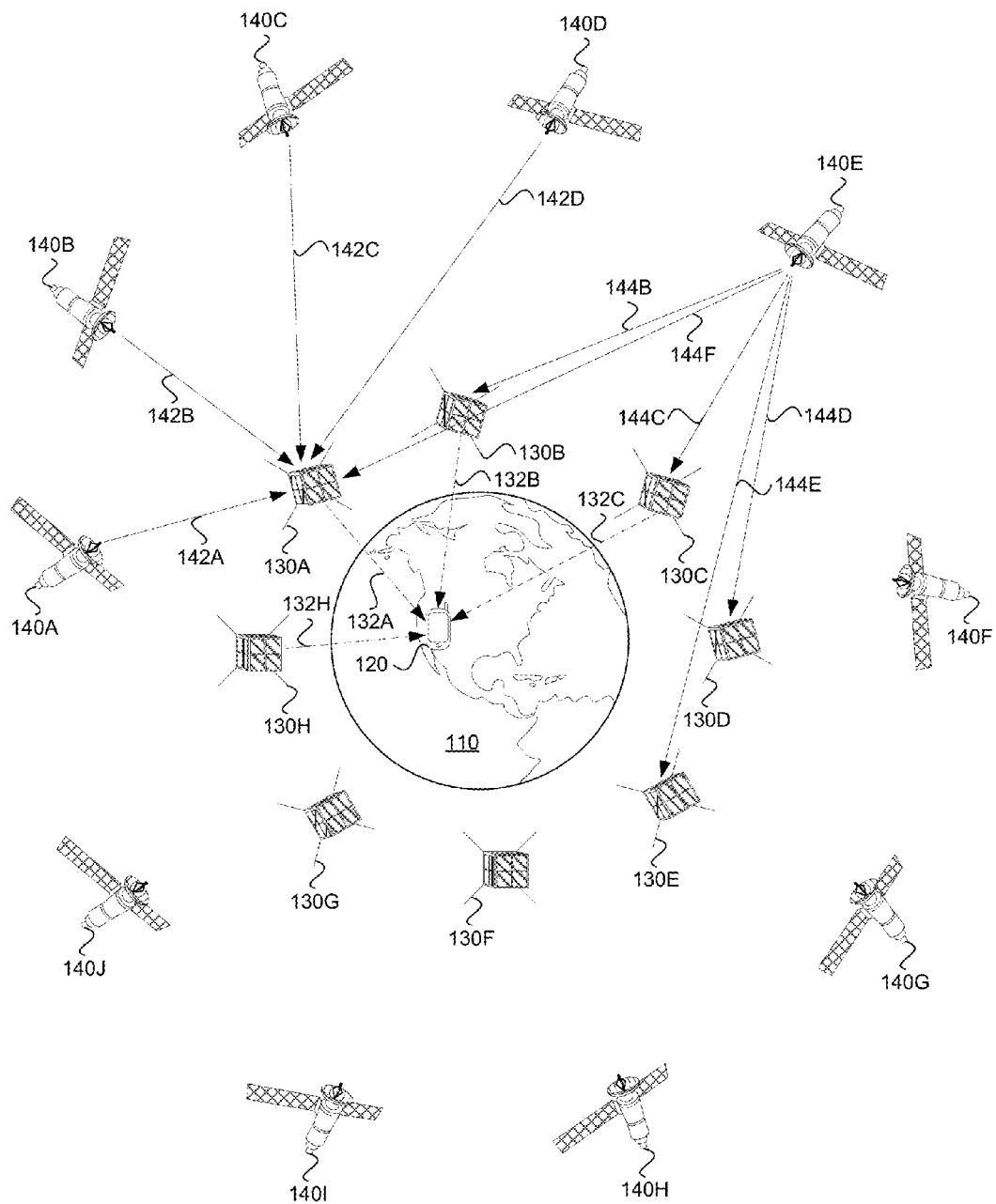
FIG. 3 illustrates a diagram of a plurality of global positioning system (GPS) satellites, a plurality of GPS and Doppler augmentation (GDAUG) satellites (GSAT), and a GDAUG end receiver (GDER) in accordance with an example.

As illustrated in FIG. 3, the GDAUG system can include a constellation of low Earth orbit (LEO) satellites (or a plurality of GSATs 130A-H). LEO can generally be defined as an orbit within the locus extending from the Earth's surface 110 up to an altitude of approximately 2,000 kilometers (km). The GSAT can be a LEO satellite. A GPS can operate with a constellation of 24 GPS satellites 140A-J. The GPS satellites can be medium Earth orbit (MEO) satellites. MEO, also known as an intermediate circular orbit (ICO), can be a region of space around the Earth above the LEO (altitude of approximately 2,000 km or 1,243 miles (mi)) and below geostationary orbit (altitude of 35,786 km or 22,236 ml). The geostationary orbit, also known as the geostationary Earth orbit (GEO), can have a period equal to the Earth's rotational period and an orbital eccentricity of approximately zero. An object in the GEO can appear motionless, at a fixed position in the sky, relative to ground observers. The GSAT may be in an orbit between a GPS satellite and a surface of the Earth.

The number of GSATs in the GSAT constellation may be greater than the number of GPS satellites in the GPS constellation to provide global coverage or near global coverage. For example, 66 GSATs in the GSAT constellation can provide global coverage from 800 km. Fewer GSATs can be used for non-polar coverage or if gaps can be tolerated. Each GSAT can operate independently of other GSATs.

Each GPS satellite can transmit a GPS signal to a GSAT, though as few as one may be used for GDAUG operation. For example, FIG. 3 illustrates four GPS satellites 140A-D transmitting their GPS signal 142A-D to a GSAT 130A. In another example, a GPS satellite 140E can transmit a GPS signal 144B-144F to five GSATs 130A-E. In another example, the GDER 120 can receive the S1 and S2 signals 132A-C and 132H from four GSATs 130A-C and 130H.

The GSAT can receive GPS signals from multiple GPS satellites, and the GSAT can transmit the S1 and S2 signals to multiple GDERs (not shown). The GDER can process the S1 and S2 signals from multiple GSATs. Using the GSAT in LEO instead of a GPS in MEO can reduce the power consumed to transmit the S1 and/or S2 signals by placing the GSAT closer to the GDER. The GSAT can have a much lower cost, simpler design, and fewer components than a GPS. For example, a GSAT may be configured so as to not include an atomic clock.

Given the close range of the GSAT in LEO to the GDER, the signal strength for the S1 or the S2 signals can be less than 10 watts (W), in an example. In another example, transmission of the S1 signal and the S2 signal can be alternated to save power. In another example, the transmission of the S1 signal and the S2 signal can transmit at regular intervals less than the GPS transmission interval to save power. In an example, the GSAT can be a satellite with a stable orbit within the LEO or MEO. In another example, the GSAT can have an unknown ephemeris, velocity, and/or position.

A GEO satellite can have a velocity of approximately 3 km/second (sec) to match the velocity of the Earth with an apparent velocity of approximately 0 km/sec. The apparent velocity can be an object's velocity, such as a satellite, relative to another object, such as a GPS receiver or a GDER at a fixed point on the Earth. A GPS satellite can have an apparent velocity of less than 1 km/sec relative to the fixed point on the Earth. The GSAT in the LEO (or other LEO satellite) can have an orbit with an apparent velocity of approximately 5 to 7.5 km/sec relative to the fixed point on the Earth. If a GSAT has an apparent velocity of approximately 7 km/sec relative to the fixed point on the Earth, the GSAT can have an apparent velocity of approximately 6 km/sec (7 km/sec for the GSAT−1 km/sec for the GPS satellite) relative to a GPS satellite when the GSAT is moving towards the GPS satellite, and the GSAT can have an apparent velocity of approximately 8 km/sec (7 km/sec for the GSAT+1 km/sec for the GPS satellite) relative to a GPS satellite when the GSAT is moving away from the GPS satellite. Measuring the speed of the GSAT using the Doppler shift of a signal transmitted by the GSAT can be used to generate global positioning in a system to augment the GPS.

A Doppler shift can be a change in a frequency (or a change in a wavelength) of a wave for an observer, such as a receiver, moving relative to the source of the wave, such as a transmitter on a satellite. The motion of the observer, the source, or both can generate a change of the frequency. The relative changes in frequency due to the Doppler effect can be explained as follows. When the source of the waves is moving toward the observer, each successive wave crest is emitted from a position closer to the observer than the previous wave. Therefore, each wave takes slightly less time to reach the observer than the previous wave. Thus, the time between the arrival of successive wave crests at the observer is reduced, causing an increase in the frequency. While the waves are traveling, the distance between successive wave fronts is reduced, so the waves "bunch together". Conversely, if the source of waves is moving away from the observer, each wave is emitted from a position farther from the observer than the previous wave, so the arrival time between successive waves is increased, reducing the frequency. The distance between successive wave fronts is increased, so the waves "spread out".

The Doppler shift can be proportional to the carrier frequency. Higher frequencies can provide more accuracy in Doppler measurements than lower frequencies but generating higher frequencies can consume more power in the GSAT than lower frequencies. Objects moving at greater velocities relative to each other can provide more accuracy in Doppler measurements than objects moving at slower velocities relative to each other. Objects at closer distances to each other can provide more accuracy in Doppler measurements than objects at farther distances to each other. The GSAT operating in LEO can impose a greater amount of Doppler shift on the transponded signal than a direct signal between the GPS satellite and the GDER. The Doppler shift of the GSAT to a known point can uniquely determine the orbital parameters of the GSAT. The Doppler shift can be the shift between GPS and the GSAT and/or GSAT and the GDER Each GPS signal received by the GSAT can experience a Doppler shift in frequency due to the relative motion between each GPS satellite and the GSAT. Thus, the GSAT can receive a different Doppler shift for each GPS signal. The GSAT can frequency shift each GPS signal including the respective Doppler shift and generate a S1 signal for each GPS signal received, and transmit each S1 to the GDER. Each S1 signal received by the GDER can also experience a Doppler shift in frequency due to the relative motion between the GSAT and the GDER. So, each transponded GPS signal (S1) can be "double Doppler shifted" when received by the GDER. Each S1 signal can have the sum of the Doppler shift from the GPS satellite to the GSAT (in the L1 and/or L2 signals) and the Doppler shift from the GSAT to the GDER. Due to the velocity of the GSAT relative to the GDER and the GPS satellite, the S1 signals generated from the GPS satellites in view can have much greater possible Doppler frequency shift than GPS signals sent directly from the GPS satellites to the GDER. The S1 signals can have the same code division multiple access (CDMA) codes as the original GPS signals (L1 and/or L2 signals). The GDER can despread, demodulate, and/or decode the S1 signals to obtain the ephemeris of each GPS satellite and to estimate the time of signal flight from GPS to the GDER via the GSAT. The time of flight can provide a two-leg "super-range" for each S1 signal. Each super-range can be the sum of the distances from the GPS satellite associated with the S1 signal to the GSAT and from the GSAT to the GDER.

The GDER can also receive the S2 signal generated by the GSAT. The Doppler shift of S2 can be computed to determine a GSAT Doppler shift measurement from the GSAT to the GDER. The measurement can be used to determine a fraction of the Doppler shift of S1 due to the path from the GPS satellite to the GSAT and/or a fraction of the Doppler shift of S1 due to the path from the GSAT to the GDER. The Doppler shift of each GPS signal (L1 and/or L2) as received by GSAT can be represented by $GLD_n$, for N GPS signals where N and n are positive integers and n≤N. The S1 signal and the S2 signal can be transmitted on different frequencies. Each S1 signal can be transmitted on a different frequency from other S1 signals. In another example, the frequency of the S1 signal and the S2 signal can vary in a coordinated scheme between the GSAT and the GDER.

Each $GLD_n$ can vary with time in a pattern corresponding to relative orbits of each GPS and GSAT. The GDER can estimate the position of the GSAT using each $GLD_n$ and a previously decoded ephemeris of each GPS. The estimate of ephemeris can be aided by trending the Doppler shift of S2. Thus, a 3-D GSAT position (or GSAT orbit) and a GPS-to-GSAT range for each super-range measurement or value can be determined.

The remaining distance in each super-range after the associated GPS-to-GSAT range is removed can be a GSAT range (or GSAT-to-GDER range). A residual error in the range estimate can be due to a difference in time between the GDER clock and the GPS clock. The GSAT processing delay can be known and can include the time between receiving a GPS signal at the GSAT and transmitting the signal from the GSAT. GDERs using more accurate oscillators can have less clock error. The GDER clock error can be substantial (e.g., 1 microsecond [psec] can corresponds to a 300 meter error) and can adversely affect the estimated volume in which the GDER is located. The estimated volume can be a long, thin cylinder whose long dimension is centered on the line between the GSAT and GDER. As the GSAT moves rapidly across the sky, a series of "error cylinders" can be generated with a long axis of each error cylinder pointing towards the GSAT. The GDER can compute the intersections of the long cylinders to determine a final 3-D position of GDER. Once a 3-D position of the GDER is known, the GDER can correct clock errors and update its position very precisely in 3-D coordinates. Alternatively, signals from two or more GSATs may be received in parallel or sequentially to refine the position estimate and reduce/remove the effects of clock bias.

A trend in the Doppler shift of S2 signals combined with range measurements can be used to precisely determine the location of the GDER (within a small circular error) at a known altitude or with a stable altitude. When a prior knowledge of the GDER's altitude is not known, an altimeter can be used to provide an altitude of the GDER. The altimeter can be used to initialize the altitude of the GDER. The altimeter can be a pressure altimeter or a barometric altimeter, but other types of altimeters can also be used, such as a sonic altimeter or a RADAR (radio detection and ranging) altimeter. When altitude is not known, the GDER may occupy a cylindrical region of uncertainty.

Figure 4A:
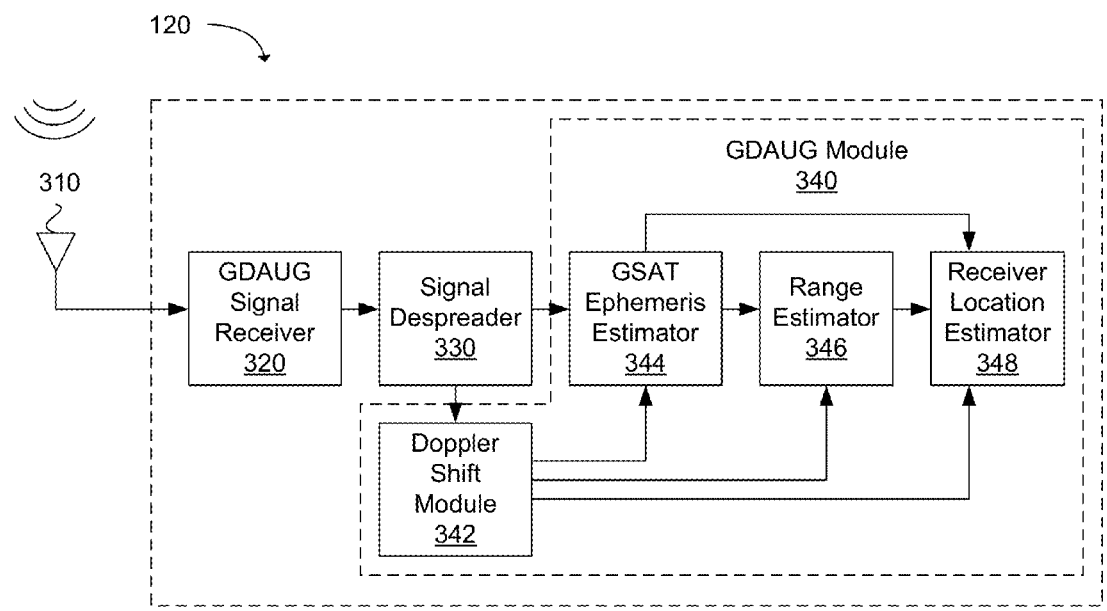
FIG. 4A illustrates a block diagram of a global positioning system (GPS) and Doppler augmentation (GDAUG) end receiver (GDER) in accordance with an example.

FIG. 4A illustrates an example of the GDER 120. The GDER can include a GDAUG receiver antenna 310, a GDAUG signal receiver 320, a signal despreader 330, and a GDAUG module 340. The GDAUG receiver antenna and/or the GDAUG signal receiver can receive the S1 signals and the S2 signal. The GDAUG receiver antenna may be a broad angle antenna capable of receiving continuous signals from LEO satellites. The signal despreader can demodulate, despread, and/or decode the S1 signals. The signal despreader can extract the time at a GPS satellite, a GPS satellite location, a GPS satellite identifier, and/or a GPS satellite ephemeris from the S1 signal. The signal despreader can be used to determine the TOF of the L1 or L2 signal combined with the S1 signal (or super-range measurement). The S1 signal can be used to generate a super-range measurement from the GPS satellite to the GDER via the GSAT. Each super-range measurement can represent a time of flight (TOF) distance from the associated GPS satellite to the GSAT to the GDER in a bent pipe configuration. The time of the L1 or L2 signal's origin, also encoded in the S1 signal, can be used to generate the super-range measurement. A different detector can be used to detect the S2 signal. In another example, the GDAUG module may also generate the super-range measurement.

The GDAUG module 340 can generate a GDER position using a TOF super-range measurement, a Doppler shift in a plurality of transponded GPS signals (S1 signals), and/or a Doppler shift in a GSAT signal (S2 signals). The GDAUG module can include a Doppler shift module 342, a GSAT ephemeris estimator 344, a range estimator 346, and a receiver location estimator 348. The Doppler shift module can measure a Doppler shift in the S1 signals and a Doppler shift in the S2 signals. The Doppler shift in the S1 signal can represent the double Doppler shift of the combined Doppler shift in the L1 or L2 signal plus the Doppler shift in transponded L1 or L2 signal from the GSAT to the GDER. The Doppler shift in the S2 signal (or GSAT Doppler shift measurement) can be used to derive the portion of Doppler shift of the S1 signal due to a GSAT to GDER distance. The GSAT Doppler shift measurement can provide the Doppler frequency shift due to the path from GSAT to GDER.

The GSAT ephemeris estimator can determine a GSAT position by removing, subtracting, or otherwise compensating for the GSAT Doppler shift measurement in each of the super-range measurements to generate GPS-to-GSAT ranges for each super-range. The GSAT position can then be generated from GPS satellite positions extracted from the S1 signals and the GPS-to-GSAT ranges. The GSAT ephemeris estimator can continually iterate the GSAT position based on updated S1 signals, updated S2 signals, updated super-ranges, updated GSAT-to-GDER ranges, and/or updated GPS-to-GSAT ranges. The GSAT ephemeris estimator can seed or initialize the iteration with an expected orbit for the GSAT.

The range estimator can calculate a GSAT range from the GSAT to the GDER by removing the GPS-to-GSAT range from an associated super-range measurement. The receiver location estimator can estimate a GDER position using the GSAT position and the GSAT range plus the portion of Doppler shift of S1 from GSAT to GDER and/or the Doppler shift in S2. The range estimator can continually iterate the GDER position based on the updated GSAT position and/or the updated GSAT range.

The GDAUG module can report and iterate the position and velocity of the GDER and GSAT along with the GSAT ephemeris. The GSAT ephemeris estimator can trend the GSAT location over time to generate an instantaneous or average GSAT velocity and/or a GSAT ephemeris. The Doppler shift module can trend the Doppler shift of the S1 signals and the S2 signal to generate a 3-D GSAT location, a GSAT velocity, and/or a GSAT ephemeris. The trending of the S1 signals by the Doppler shift module can be used to verify the GDER position and/or the GDER velocity.

A GDER location can be determined with greater accuracy when the GDER is stationary versus a mobile GDER. Movement in the GDER can introduce additional errors and inaccuracies which can be corrected with trending of the GSAT location, the trending of the Doppler shift of the S1 signals, and/or the trending of the Doppler shift of the S2 signal. An inertial measurement unit (IMU), such as a pedometer, can be included in the GDER to account for the movement of a GDER. The IMU and/or the altimeter can be included in the receiver location estimator of the GDER. The GDAUG module can reset the clock bias using S1 signals and/or the 3-D GSAT location.

Figure 4B:
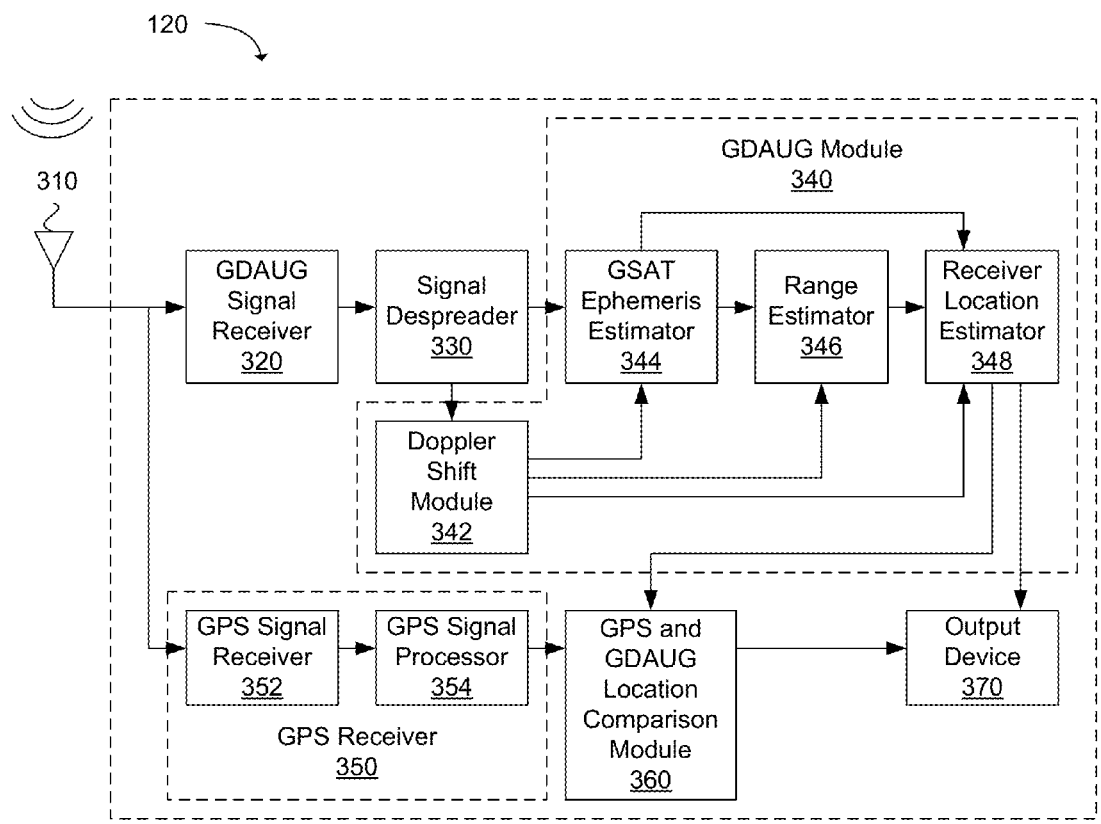
FIG. 4B illustrates a block diagram of a global positioning system (GPS) and Doppler augmentation (GDAUG) end receiver (GDER) with a GPS receiver in accordance with an example.

FIG. 4B illustrates another example of the GDER 120 to include a GPS receiver 350. The GPS receiver can include a GPS signal receiver 352 and a GPS signal processor 352 for obtaining a global positioning of the GDER using standard GPS processing. The GPS receiver can receive GPS signals directly from GPS satellites and determine a global position of the GDER using the GPS signals transmitted by the GPS satellites. The GPS receiver can use the GDAUG receiver antenna 310 or a separate GPS receiver antenna (not shown).

The GDER location provided by the GDAUG module (or GDAUG location) can be compared with the GDER location provided by the GPS receiver (or GPS location) in a GPS and GDAUG location comparison module 360. The GPS and GDAUG location comparison module can determine a difference between the GDAUG location and the GPS location, and determine if the locations are within a specified tolerance. When the locations are outside a specified tolerance, the GDER can determine that spoofing or jamming is occurring and display or use the GDAUG location. If the GPS receiver is unable to generate a GPS location or an accurate GPS location due to jamming or not enough GPS satellites in view of the GDER, the GDER can use the GDAUG location. If the GDAUG module is unable to generate a GDAUG location or an accurate GDAUG location due to a GSAT not in view of the GDER or a GPS not in view of the GSAT, the GDER can use the GPS location. In another example the GDAUG module, the GPS and GDAUG location comparison module, and the GPS receiver can be coupled to an output device 370. The output device can be a display, screen, printer, an input/output (I/O) port, or transmitter that can transmit the location to another device. In another example, the GDER (not shown) can also combine the processing of GPS signals, S1 signals, and S2 signals to generate a composite GPS-GDAUG location.

When the GDER already determined the GDER position or location initially (from the GDAUG module, the GPS receiver, or other global positioning mechanism), a condition known as a hot start or steady state positioning, signals from one or two GSATS may be used to maintain a GDER's 3-D location. The GDER location may become more accurate with a longer GDER time of operation. For example, the GDER can produce accuracy within a 100 meter (m) range within 70 seconds of operation, 50 m within 85 seconds of operation, and 25 m within 100 seconds of operation. The accuracy can continue to improve with time. The time to initialize the GDER location can depend on the number of GSATs in view and whether the GDER is moving or not. A stationary GDER may be initialized more rapidly than a moving GDER.

The GDAUG system can provide reuse of GPS signals, GPS spoof detection, and a backup global positioning system if the GPS is jammed or spoofed. The GDAUG system can provide simplex communication, which can be faster, more accurate, and use less satellite processing than TRANSIT (a predecessor system to GPS, also known as Navy Navigation Satellite System [NAVSAT]), the duplex communication systems of GLOBALSTAR (a LEO satellite constellation for satellite phone and low-speed data communications) or GATEWAY and other duplex communication systems. The GDAUG system can be used when fewer than three GPS satellites have a direct LOS with the GDER.

Figure 5:
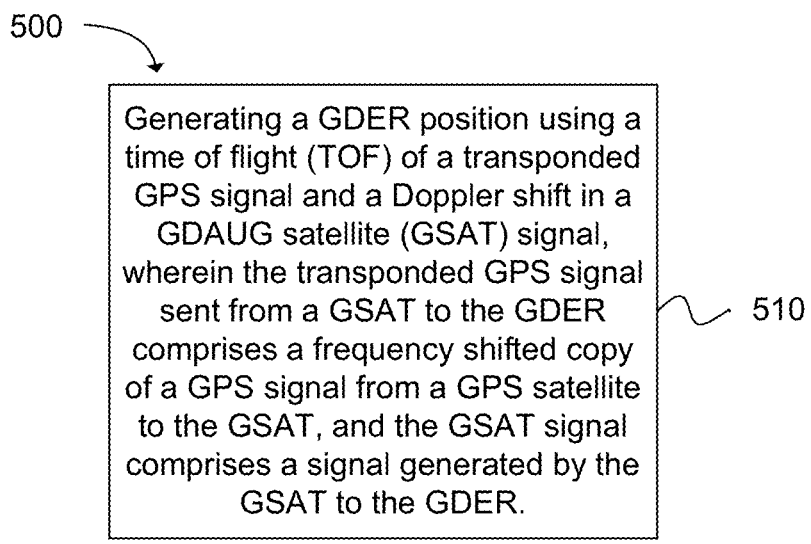
FIG. 5 depicts a flow chart of a method for global positioning using a global positioning system (GPS) and Doppler augmentation (GDAUG) end receiver (GDER) in accordance with an example.

Another example provides a method 500 for global positioning using a global positioning system (GPS) and Doppler augmentation (GDAUG) end receiver (GDER), as shown in the flow chart in FIG. 5. The method includes the operation of generating a GDER position using a time of flight (TOF) of a transponded GPS signal and a Doppler shift in a GDAUG satellite (GSAT) signal, wherein the transponded GPS signal sent from a GSAT to the GDER comprises a frequency shifted copy of a GPS signal from a GPS satellite to the GSAT, and the GSAT signal comprises a signal generated by the GSAT to the GDER, as in block 510.

The operation of generating a GDER position can include: generating a super-range measurement from the transponded GPS signal, wherein the super-range measurement represents a distance from the GPS to the GDER via the GSAT; measuring a Doppler shift in the GSAT signal; determining a GSAT position by measuring a trend in a plurality of GSAT Doppler shift measurements from a plurality of GSAT signals; calculating a GSAT range from the GSAT position and the super-range measurement of the transponded GPS signal; and estimating a GDER position using the GSAT position and the GSAT range. The operation of determining the GSAT position can further include: measuring a Doppler shift in the transponded GPS signal, extracting the Doppler shift due to the GSAT range from the Doppler shift of the transponded GPS signal to generate a Doppler shift of the GPS signal, and estimating the GSAT position using the Doppler shift of the GPS signal. The method 500 can further include the operations of: receiving the plurality of transponded GPS signals and the GSAT signal; demodulating the plurality of transponded GPS signals; and detecting the GSAT signal.

Figure 6:
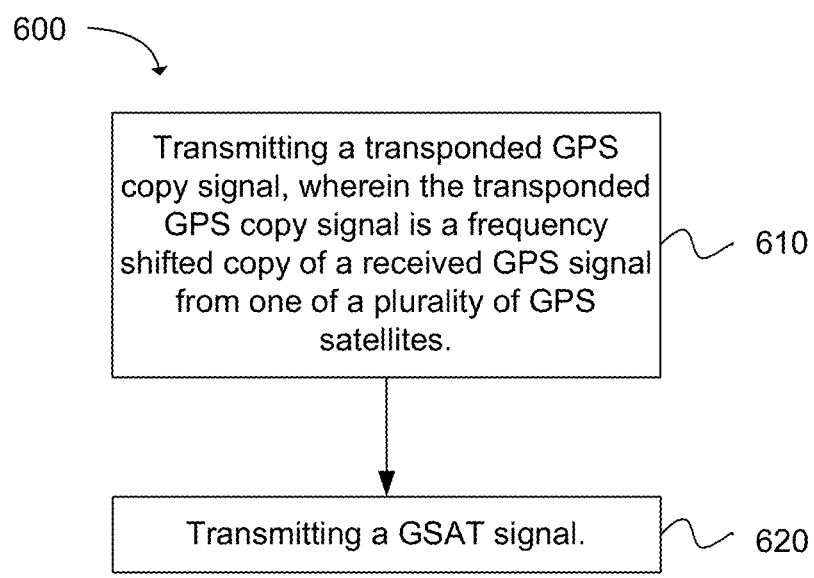
FIG. 6 depicts a flow chart of a method for global positioning using a global positioning system (GPS) and Doppler augmentation (GDAUG) satellite (GSAT) in accordance with an example.

Another example provides a method 600 for global positioning using a global positioning system (GPS) and doppler augmentation (GDAUG) satellite (GSAT), as shown in the flow chart in FIG. 6. The method includes the operation of transmitting a transponded GPS signal, wherein the transponded GPS signal is a frequency shifted copy of a received GPS signal from one of a plurality of GPS satellites, as in block 610. The operation of transmitting a GSAT signal follows, as in block 620.

The operation of transmitting a transponded GPS signal can include: receiving a GPS signal from a GPS satellite by the GSAT; frequency shifting the GPS signal to generate a transponded GPS signal; and transmitting the transponded GPS signal to a GDAUG end receiver (GDER).

Figure 7:
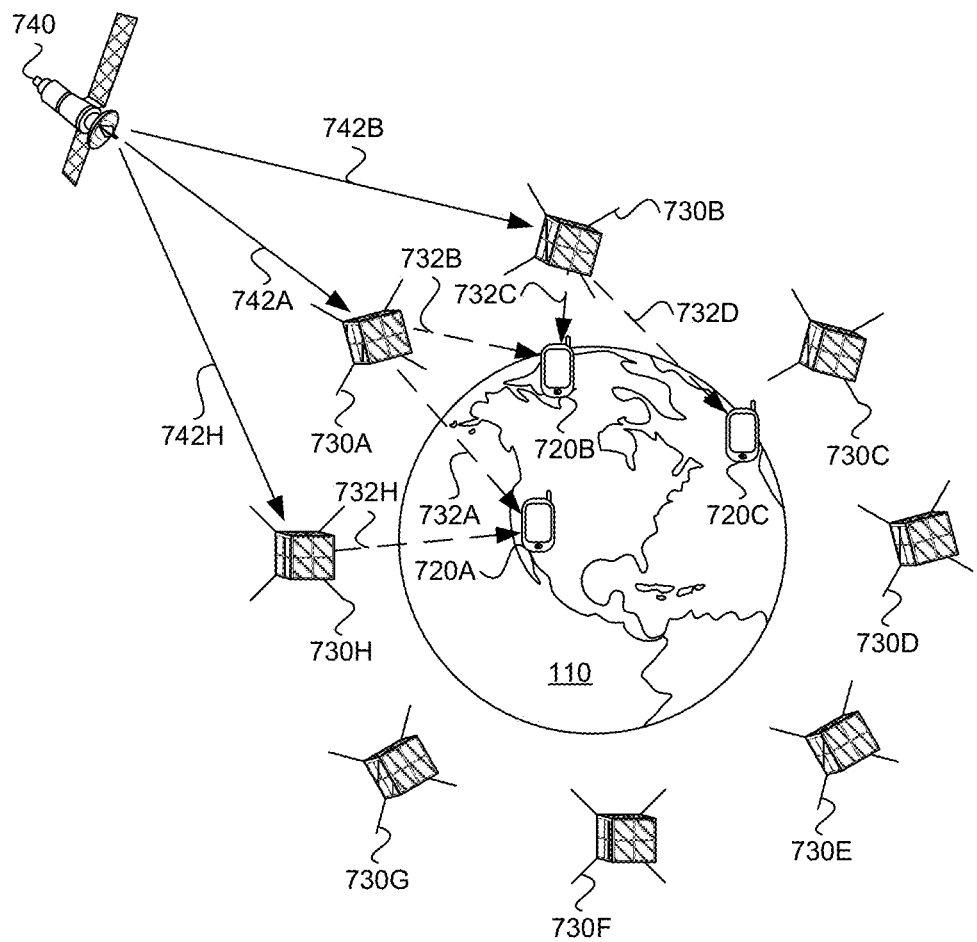
FIG. 7 illustrates a diagram of a high altitude satellite (HAS), a plurality of space location inertial navigation geopositioning system (SPACELINGS) satellites (SLS), and a plurality of SPACELINGS end receivers (SER) in accordance with an example.

In another embodiment, global positioning can be determined using a space location inertial navigation geopositioning system (SPACELINGS). FIG. 7 illustrates a segment of SPACELINGS, which can be used to provide GPS-type position accuracy to a SPACELINGS end receiver (SER) 720 A-C using a high altitude satellite (HAS) 740 to generate (or relay) downlinked pseudo-random noise code (PRN code) signals (or other GPS-like signals) 742A-B and 742H relayed through a SPACELINGS satellite (SLS) 730A-H. The downlinked PRN signals 742A-B and 742H from the HAS to the SLS can be represented symbolically by H1 and H2 signals. In other examples, H1 and H2 can represent the frequency carriers of the H1 and H2 signals. The transponded PRN signal 732A-D and 732H from the SLS to the SER can be symbolically represented by a TS1 signal. In other examples, TS1 can represent the frequency carrier of the TS1 signal. A downlink can represent a channel for transmission or a signal transmitted from a higher altitude device, such as a satellite or a higher satellite, to a lower altitude device, such as an end receiver, a ground station, or a lower satellite. Similarly, an uplink can represent a channel for transmission or signal transmitted from a lower altitude device, such as an end receiver, a ground station, or a lower satellite, to a higher altitude device, such as a satellite or a higher satellite.

The HAS can have an altitude that exceeds a GPS satellite in a MEO, a GEO, or a high Earth orbit (HEO). The HEO is a geocentric orbit whose apogee (i.e., the highest or most distant point) lies above that of a geosynchronous orbit. In an example, a MEO satellite can have an orbital altitude of approximately 20 km with a near 12 hour orbit. A GEO can have a near 24 hour orbit, or an orbit near the rotational rate of the Earth, hence geostationary Earth orbit (GEO). The HAS can be further away from the Earth than a GPS satellite, and the HAS can be in a LOS of more LEO satellites (such as SLSs and GSATs) than a GPS satellite. The constellation of HASs can be smaller than the constellation of GPS satellites because the HAS can transmit to more LEO satellites (such as SLSs and GSATs). In an embodiment, the constellation of HASs can include one or two satellites. For example, a GEO satellite can cover or be in the LOS of three quarters (¾) of the LEO satellites. In contrast, the constellation of GPS satellites is 24 satellites with some spare or reserve satellites. The higher the orbit of the HAS can reduce the number of satellites in the HAS constellation. The HAS constellation can be a substitute or a redundant global positioning system (GPS) operating using different frequencies and/or coding scheme from the GPS.

The SPACELINGS can provide timely space-based positioning, navigation, and timing (PNT) backup or restoration to GPS capability in case GPS is completely or partially disabled. The SPACELINGS can provide PNT services in case of loss of GPS. In addition, the SPACELINGS can provide users of GPS (e.g., user with a GPS receiver and a SER or an integrated GPS and SPACELINGS end receiver) adequate position and/or navigation information when a GPS receiver is jammed, spoofed, or insufficient GPS satellites are in view of the end receiver. The SPACELINGS can also add precision to the existing GPS. In an embodiment, the SPACELINGS can remove the dependency on GPS and eliminate a world wide network of ground stations, as is used in GPS. The SPACELINGS can provide capability in cases of a total loss of the GPS, and can augment GPS in environments (e.g. urban environments) where obtaining a line of sight (LOS) to at least four GPS satellites can be difficult. The SPACELINGS can provide a significant reduction in complexity and cost of the SLS and SER compared to the GSAT and GDER by having the LEO satellite (e.g., SLS) transmit on one frequency carrier instead of two frequency carriers (as transmitted by the GSAT), and having the end receiver (e.g., SER) receive one carrier instead of two frequency carriers (as received by the GDER).

The SPACELINGS can provide PNT restoration and GPS augmentation system using very small satellites. The augmentation can provide backup signals in case a GPS receiver is jammed or spoofed or there are too few GPS satellites in view. The SLS can be a CUBESAT or other similar type of small or inexpensive type satellite, with functionality similar to the GSAT, but to provide SPACELINGS functionality. SLS can receive signals from the HAS and transpond the signals to a SER, whereas the GSAT can receive GPS signals from the GPS satellite and transpond the GPS signals to a GDER as well as generate a GSAT signal and transmit the GSAT signal to the GDER. The SLS payload or hardware on the satellite can be reduced or simplified relative to the GSAT since the SLS can avoid generating a new or independent signal (e.g., GSAT signal).

In an example, SPACELINGS can use a modest size constellation in LEO, where each SPACELINGS satellite (SLS) in LEO has line-of-sight (LOS) to one or more high altitude satellites (HAS), such as GEO satellites. Each HAS can provide a psuedo random noise (PRN) signal on each of two known carrier frequencies (or carrier frequencies), such as H1 and H2. In an embodiment, one HAS can cover most of the LEO satellites, and two HAS can provide global coverage to the LEO satellites.

The HAS can generate two PRN code signals (or other GPS-like signals, such as commercial coarse-acquisition (C/A)-type code, a military P(Y)-type code, or an M-type code using a varied GPS signal structure) on at least two different carrier frequencies (e.g., H1 and H2). The H1 and H2 can operate on a different frequency carrier from a GPS frequency carrier, such as L1 and L2. The H1 and H2 can operate on a different frequency carrier as the common carrier or TS1 signal transmitted from the SLS to the SER.

Each SLS acts as a "bent pipe" (similar to a GSAT), transponder relay of the downlink PRN signals or HAS signals, as previously discussed with GDAUG. The SLS can detects two analog radio frequency (RF) signals from the HAS, can shift each HAS signal, and combine the HAS signals to a new but common frequency (e.g. TS1). The common frequency of TS1 can be a more favorable, unjammed frequency, which can be frequency hopped in a known configuration for extra protection against spoofing and jamming.

A receiver on the SLS, which SLS can be in LEO, can "hear" a Doppler shift for each of H1 and H2. The TS1 transponded signal (e.g., transponded PRN signal) can be "double Doppler shifted" when received by a SER, as discussed below. The "double Doppler shifted" transponded PRN signal can include the sum of the Doppler shift from the HAS to the SLS and the SLS to the SER (e.g., the user). The two signals can be used by the end receiver (e.g., SER) to determine the Doppler shift from the HAS to the SLS and the remaining Doppler shift from the SLS to the SER, in a similar manner as described with the GDER.

The SER can despread and/or code the transponded signals to obtain the ephemeris of each HAS satellite and the SER can estimate the time of signal flight from HAS to SER. The time of flight can provide the two-leg "super range" for each HAS transponded signal, where each leg represents a signal path. Each super range can be the sum of the distances from HAS to SLS to SER.

The Doppler shift from HAS to SLS can be used by the SER to determine the ephemeris of each SLS. The SER can then determine the Doppler shift from the SLS to the SER and portion of the super range from SLS to SER. The time history of these range and Doppler shift measurements can be used by the SER to estimate a position of the SER.

The H1 and H2 frequency carriers can differ from the frequency carrier of the TS signal. The H1, H2, and TS1 signals can operate in a frequency band (a HAS frequency band or a SLS frequency band) between a very high frequency (VHF) band to a K-under ($K_u$) band. The H1, H2, and TS1 signals can operate in a frequency band higher than the frequency band used for GPS, which can eliminate some of the adverse effects of the ionosphere, but the higher frequency may also use more power to transmit the PRN signals relative to GPS signals.

The two signals on a common carrier have unique Doppler shifts when received by the LEO satellite, which can be used in turn by the end receiver to deduce the LEO ephemeris. In another example, the double Doppler shift can be extracted from two signals, which can be shown mathematically. The HAS can broadcast or transmit the H1 and H2 signals to the SLS. The SLS can receive $$H1\left(1+\frac{v_1}{c}\right) \text{ and } H2\left(1+\frac{v_1}{c}\right)$$

where the $v_1$ represents the velocity of the HAS relative to the SLS and c represents a speed of light constant (e.g., 299,792, 458 meter per second). The received Doppler shifted H1 and H2 signal can be frequency shifted by a known frequency, such as plus or minus (±) frequency f, to a common carrier to transmit TS1. The two expressions $$\left(H1\left(1+\frac{v_1}{c}\right)+f\right)\left(1+\frac{v_2}{c}\right) \text{ and } \left(H2\left(1+\frac{v_1}{c}\right)-f\right)\left(1+\frac{v_2}{c}\right)$$

received at the SER as TS1 can be measured separately, where $v_2$ represents the velocity of the SLS relative to the SER. The received TS1 can include two equations with two unknowns (e.g., $V_1$ and $v_2$), which unknowns can be solved.

In another example, H1 can be frequency shifted by the common frequency carrier of TS1 by a known frequency $f_1$, so the H1 component of TS1 received at the SER can be represented by $$\left(H1\left(1+\frac{v_1}{c}\right)+f_1\right)\left(1+\frac{v_2}{c}\right)$$

t and H1 can be frequency shifted by the common frequency carrier of TS1 by a known frequency $f_2$, so the H2 component of TS1 received at the SER can be represented by $$\left(H2\left(1+\frac{v_1}{c}\right)+f_2\right)\left(1+\frac{v_2}{c}\right),$$

where the $f_1$ and $f_2$ can be positive or negative. The H1 component and H2 component of TS1 can be solved for $v_1$ and $v_2$. The relative velocity $v_1$ can be used to determine ephemeris of the SLS, and relative velocity $v_2$ can be used to determine ephemeris of the HAS after the ephemeris of the SLS is determined. The H1 component can have a common Doppler component $$\left(1+\frac{v_2}{c}\right)$$

with the H2 component, and H1 component can have a unique Doppler component $$\left(H1\left(1+\frac{v_1}{c}\right)+f_1\right)$$

from a unique Doppler component $$\left(H2\left(1+\frac{v_1}{c}\right)+f_2\right)$$

of the H2 component.

Figure 8:
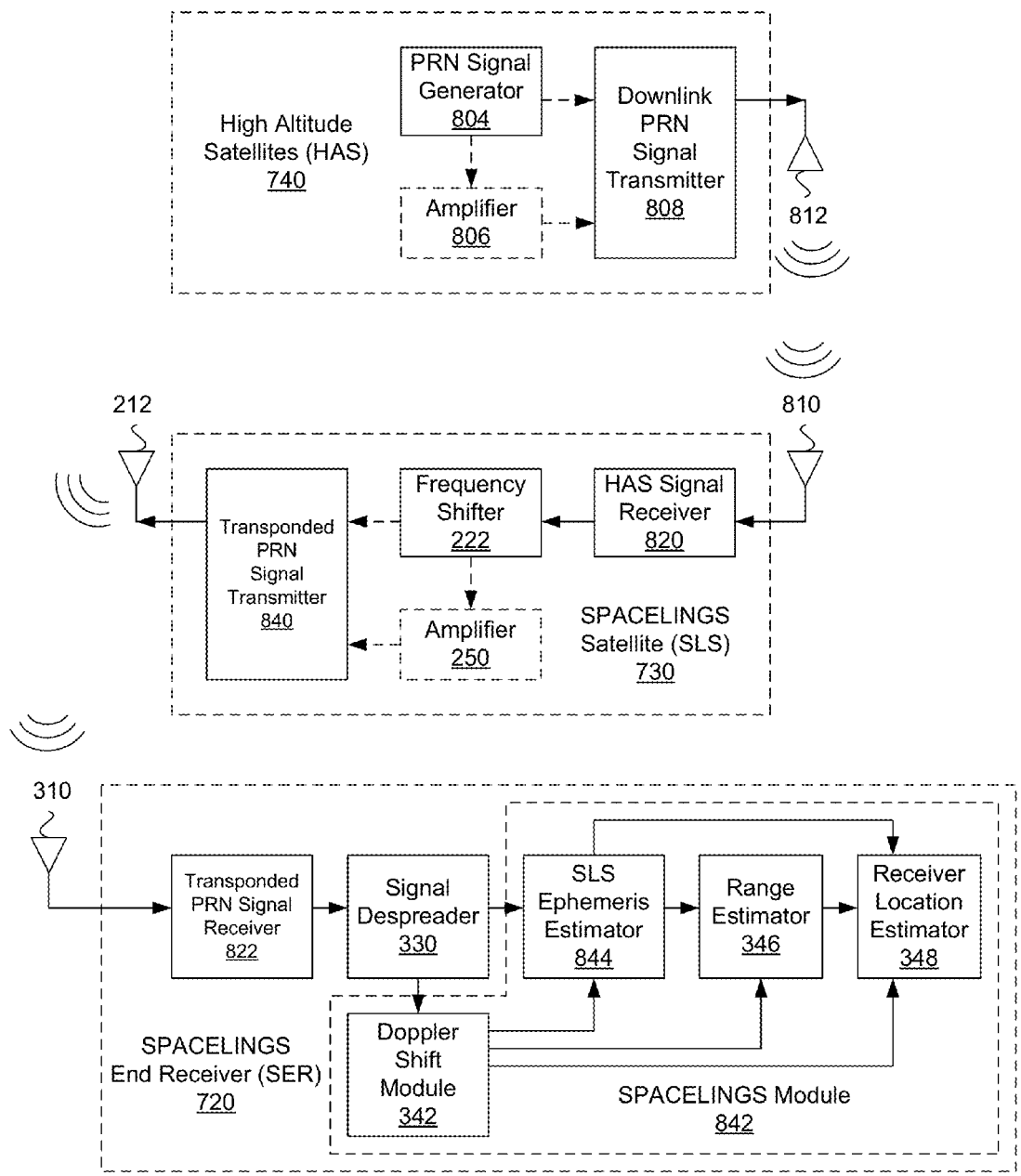
FIG. 8 illustrates a block diagram of a high altitude satellite (HAS), a space location inertial navigation geopositioning system (SPACELINGS) satellite (SLS), and a SPACELINGS end receiver (SER) in accordance with an example.

As illustrated in FIG. 8, the high altitude satellite (HAS) 740 can include a PRN signal generator 804, a downlink PRN signal transmitter 808, at least one SLS transmitting antenna 812, and an optional amplifier 806. The PRN signal generator can generate the separate H1 and H2 signals on different frequency carriers, which can be transmitted on downlink PRN signal transmitter via the at least one SLS transmitting antenna. An amplifier may be use to increase or boost the power of the downlink PRN signal. The high altitude satellite (HAS) may include a precise clock, such as an atomic clock, used in generating the PRN signals. The PRN signals may include information similar to a GPS signal, such as satellite ephemeris or position information or a transmission time, but for the HAS. The H1 and/or H2 signals can be transmitted to the SLS 730 in a simplex transmission.

The separate H1 and H2 signals can be received by the SPACELINGS satellite (SLS) 730, which can include at least one HAS receiving antenna 810, a HAS signal receiver 820 (like a GPS receiver, but for the HAS) for receiving the HAS signals (e.g., H1 and H2), a frequency shifter 222 for generating the TS1 signal from the HAS signals (H1 and/or H2), at least one SER transmitting antenna 212, and/or a transponded PRN signal transmitter 840 for combining the frequency shifted H1 and H2 signal and transmitting those signals on a common frequency carrier TS1 to the SER 720. The TS1 signals can be transmitted to the SER in a simplex transmission. The SER transmitting antenna can be a wide angle antenna to cover the Earth from a low orbit. An amplifier 250 may be use to increase or boost the power of the transponded PRN signal.

The SPACELINGS end receiver (SER) 720 can include a LEO (e.g., SLS) receiver antenna 310, a transponded PRN signal receiver 822, a signal despreader 330, and a SPACELINGS module 842. The SER can determine the Doppler shift (and a HAS-to-SLS relative velocity) due to a HAS-to-SLS signal path and the Doppler shift (and a SLS-to-SER relative velocity) due to a SLS-to-SER signal path, which can be processed by one of the modules of the SER. The SPACELINGS module 842 can generate a global position using a TOF super-range measurement and a Doppler shift in a plurality of transponded PRN signals (e.g., H1 and H2 signals). The SPACELINGS module can include a Doppler shift module 342, a SLS ephemeris estimator 844 (which is functions similar to a GSAT ephemeris estimator 844 shown in FIGS. 4A-B, but for a SLS), a range estimator 346, and a receiver location estimator 348. In an example, the SPACELINGS module functions similar to the GDAUG module and generates a global position, but for transponded PRN signals, whereas the GDAUG module used the transponded GPS signals and a GSAT signal.

Another example provides a method 1000 for global positioning using a space location inertial navigation geopositioning system (SPACELINGS) end receiver (SER), as shown in the flow chart in FIG. 9. The method includes the operation of generating a global position using a time of flight (TOF) and a Doppler shift of transponded pseudo-random noise (PRN) signals on a common frequency carrier, wherein the transponded PRN signals sent from a SPACELINGS satellite (SLS) to the SER comprises a frequency shifted copy of at least two downlink PRN signals from a high altitude satellite (HAS) to the SLS using at least two different frequency carriers from the common frequency carrier, as in block 1010.

In another embodiment, the HAS can generate a single downlink PRN signal (e.g., H1 or H2) which can be transmitted to the SLS. The SLS can frequency shift the downlink PRN signal to a common frequency carrier TS1 and transmit the signal to the SER or a ground station (e.g., ground site).

Figure 10:
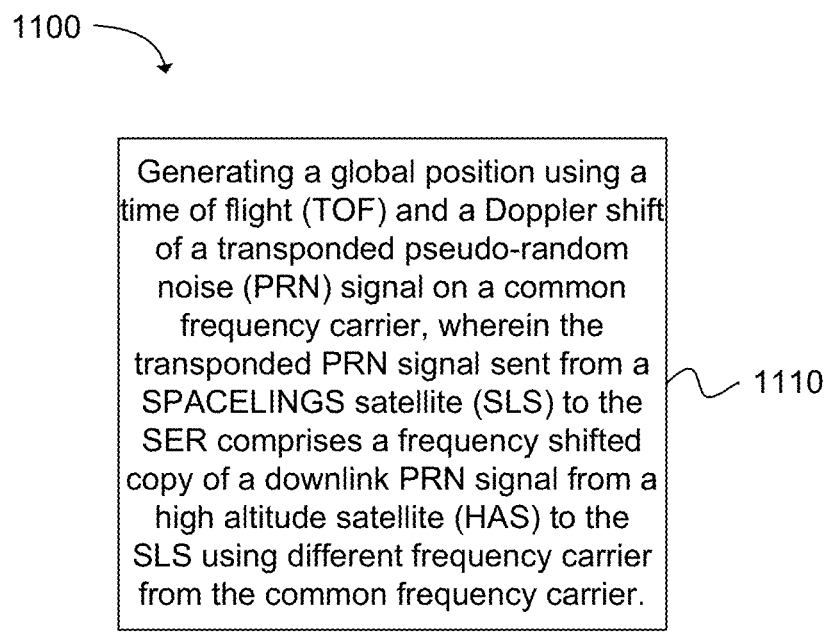
FIG. 10 depicts a flow chart of a method for global positioning using a space location inertial navigation geopositioning system (SPACELINGS) end receiver (SER) with a downlink PRN signal from a high altitude satellite (HAS) in accordance with an example.

Another example provides a method 1100 for global positioning using a space location inertial navigation geopositioning system (SPACELINGS) end receiver (SER), as shown in the flow chart in FIG. 10. The method includes the operation of generating a global position using a time of flight (TOF) and a Doppler shift of a transponded pseudo-random noise (PRN) signal on a common frequency carrier, wherein the transponded PRN signal sent from a SPACELINGS satellite (SLS) to the SER comprises a frequency shifted copy of a downlink PRN signal from a high altitude satellite (HAS) to the SLS using different frequency carrier from the common frequency carrier, as in block 1110.

In another embodiment, the HAS can generate a plurality of downlink PRN signals (e.g., H1 and H2) which can be transmitted to the SLS. The SLS can frequency shift the H1 signal to a first frequency carrier TS1A and frequency shift the H2 signal to a second frequency carrier TS1B and transmit both signals via the TS1A and TS1B, respectively, to the SER or a ground station (e.g., ground site).

Figure 11:
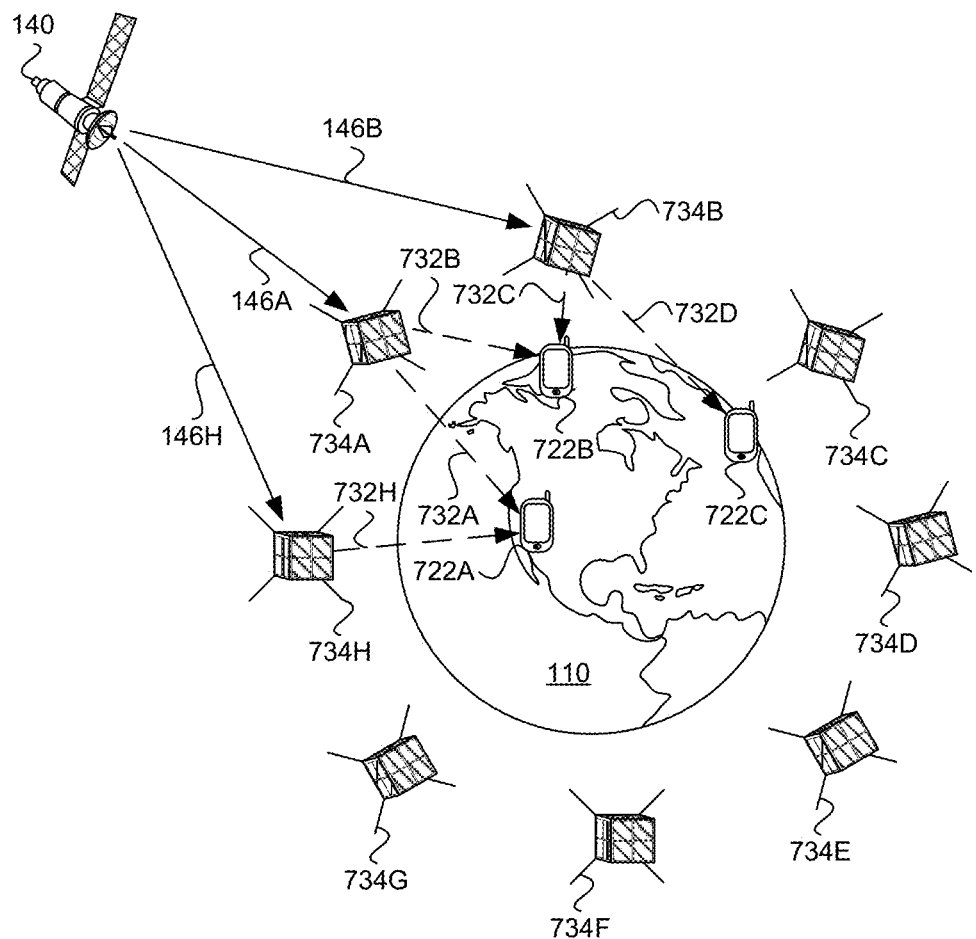
FIG. 11 illustrates a diagram of a global positioning system (GPS) satellite, a plurality of space location inertial navigation geopositioning system (SPACELINGS) satellites (SLS), and a plurality of SPACELINGS end receivers (SER) in accordance with an example.

FIG. 11 illustrates another example of a segment of SPACELINGS. The HAS can include a GPS satellite 140 and the downlink PRN signals can include GPS signals 146A-B and 146H (e.g., L1 and L2). The SLS 734A-H can receive the GPS signals (i.e., PRN signals) from the GPS satellite. Each GPS broadcasts a PRN signal on the L1 and the L2 frequency carrier. Each SLS receives the L1 and L2 signals from the GPS satellites in view and transponds the GPS signals to the common carrier frequency TS1. The SLS transmits the transponded GPS signals to the SER 722A-C and the SER determines the global position from the GPS signals (i.e., PRN signals), as previously described. L1 and L2 can undergo different Doppler shifts, proportional to their respective carrier frequencies, when received by the SLS. The TS1 can be further Doppler shifted as received by SER. The TS1 signals can be despread and decoded to separately recover the Doppler shifts of L1 and L2, which can be used to estimate the ephemeris of the SLS.

Figure 12:
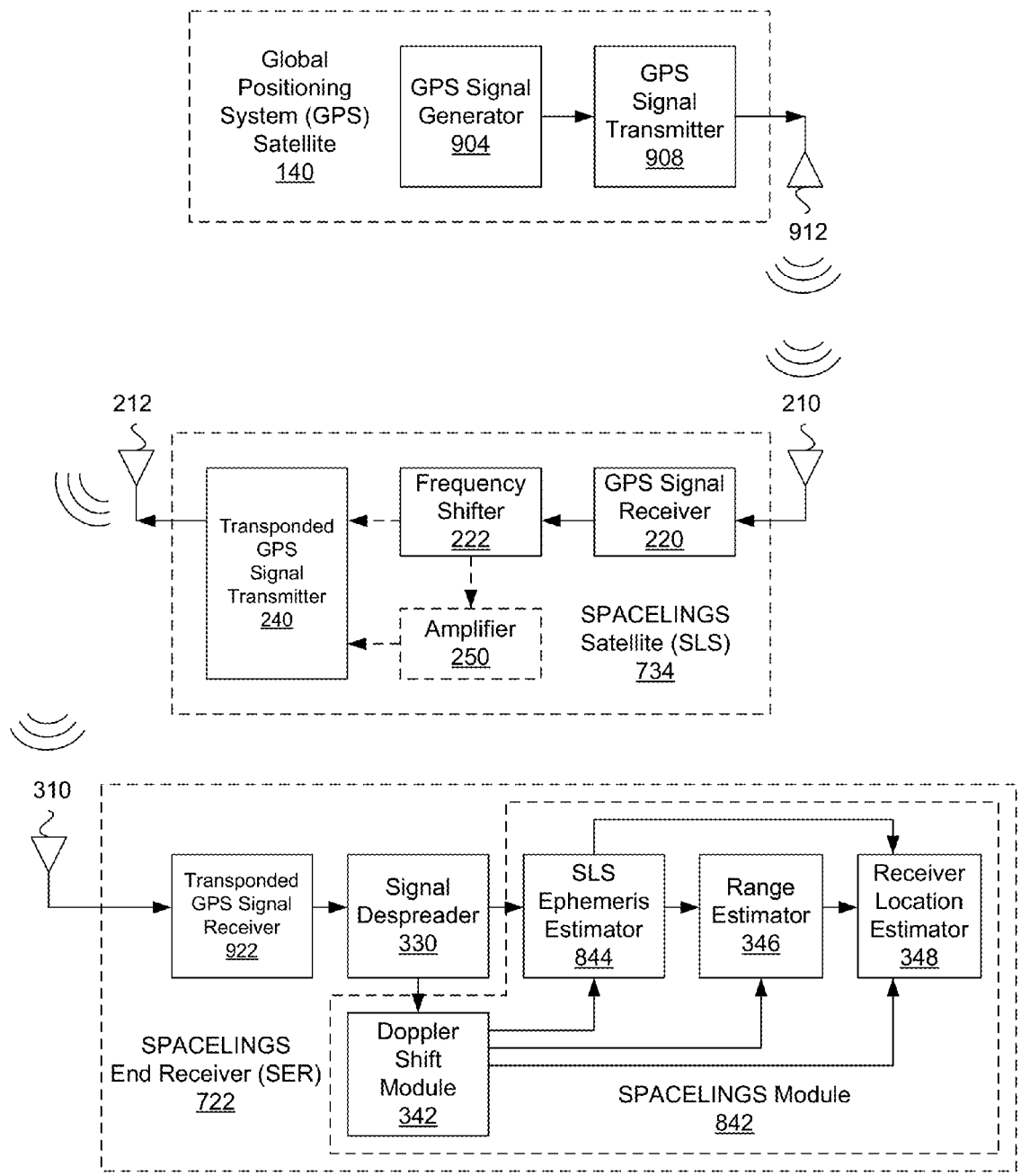
FIG. 12 illustrates a block diagram of a global positioning system (GPS) satellite, a space location inertial navigation geopositioning system (SPACELINGS) satellite (SLS), and a SPACELINGS end receiver (SER) in accordance with an example.

As illustrated in FIG. 12, the GPS satellite 140 can include GPS signal generator 904, GPS signal transmitter 908, and at least one GPS transmitting antenna 912. The GPS signal generator can generate the separate L1 and L2 signals on different frequency carriers, which can be transmitted on GPS signal transmitter via the at least one GPS transmitting antenna.

The separate L1 and L2 signals may be received by the SPACELINGS satellite (SLS) 734, which can include at least one GPS receiving antenna 210, a GPS signal receiver 820 for receiving the GPS signals (e.g., L1 and L2), a frequency shifter 222 for generating the TS1 signal from the GPS signals (L1 and/or L2), at least one SER transmitting antenna 212, and/or a transponded GPS signal transmitter 240 for combining the frequency shifted L1 and L2 signal and transmitting those signals on a common frequency carrier TS1 to the SER 722. The TS1 signals can be transmitted to the SER in a simplex transmission. The SER transmitting antenna can be a wide angle antenna to cover the Earth from a low orbit. An amplifier 250 may be use to increase or boost the power of the transponded GPS signal. In another example, the SLS can be configured to receive GPS signals, HAS signals, and/or other PRN signals.

The SPACELINGS end receiver (SER) 722 can include a GPS receiver antenna 310, a transponded GPS signal receiver 922, a signal despreader 330, and a SPACELINGS module 842. The SER can determine the Doppler shift (and a GPS-to-SLS relative velocity) due to a GPS-to-SLS signal path and the Doppler shift (and a SLS-to-SER relative velocity) due to a SLS-to-SER signal path, which can be processed by one of the modules of the SER. The SPACELINGS module 842 can generate a global position using a TOF super-range measurement and a Doppler shift in a plurality of transponded GPS signals (e.g., L1 and L2 signals).

Figure 13:
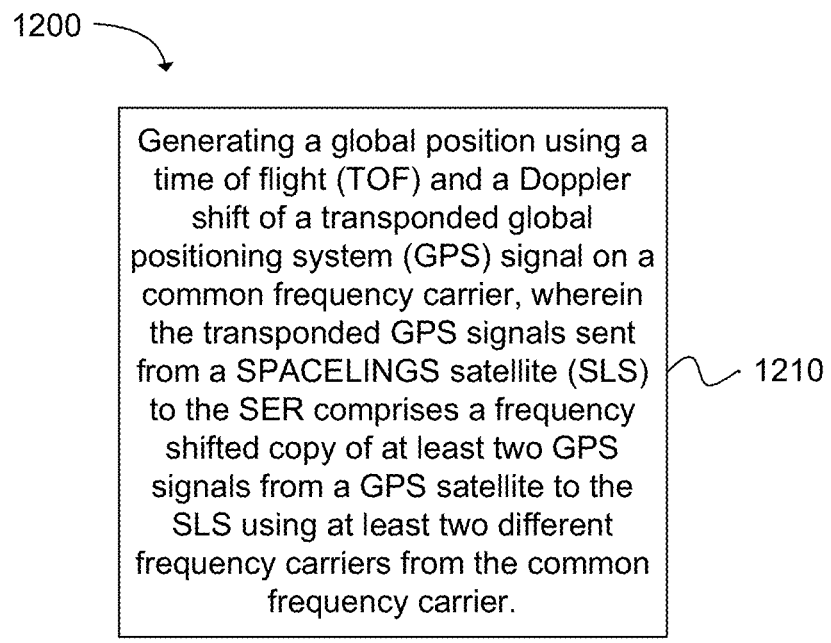
FIG. 13 depicts a flow chart of a method for global positioning using a space location inertial navigation geopositioning system (SPACELINGS) end receiver (SER) with at least two global positioning system (GPS) signals from a GPS satellite in accordance with an example.

Another example provides a method 1200 for global positioning using a space location inertial navigation geopositioning system (SPACELINGS) end receiver (SER), as shown in the flow chart in FIG. 13. The method includes the operation of generating a global position using a time of flight (TOF) and a Doppler shift of a transponded global positioning system (GPS) signal on a common frequency carrier, wherein the transponded GPS signals sent from a SPACELINGS satellite (SLS) to the SER comprises a frequency shifted copy of at least two GPS signals from a GPS satellite to the SLS using at least two different frequency carriers from the common frequency carrier, as in block 1210.

In another embodiment, the PRN signals can originate at a ground site, which can avoid flying an atomic clock on the HAS. The PRN signals can be uplinked to one or more HAS (e.g., GEO satellites or other high altitude platforms) and the PRN signals can be in-turn transponded to two carrier frequencies. The ground site can also receive the LEO satellite signals and use them to determine the ephemeris of each LEO satellite. The uplinked signal can contain the ephemeris information of each LEO satellite, the location of the HAS, and the location of the ground site. The SER (e.g., end receiver) can use range to the LEO satellite and Doppler shift from the LEO to estimate the SER position Using GEO platforms or GEO transponders can work without a world-wide network of known ground stations. In addition, one HAS or GEO satellite can provide signals to LEO satellites covering more than 75% of Earth's surface. Two HAS or GEO satellites can provide global coverage with significant redundancy.

Figure 14:
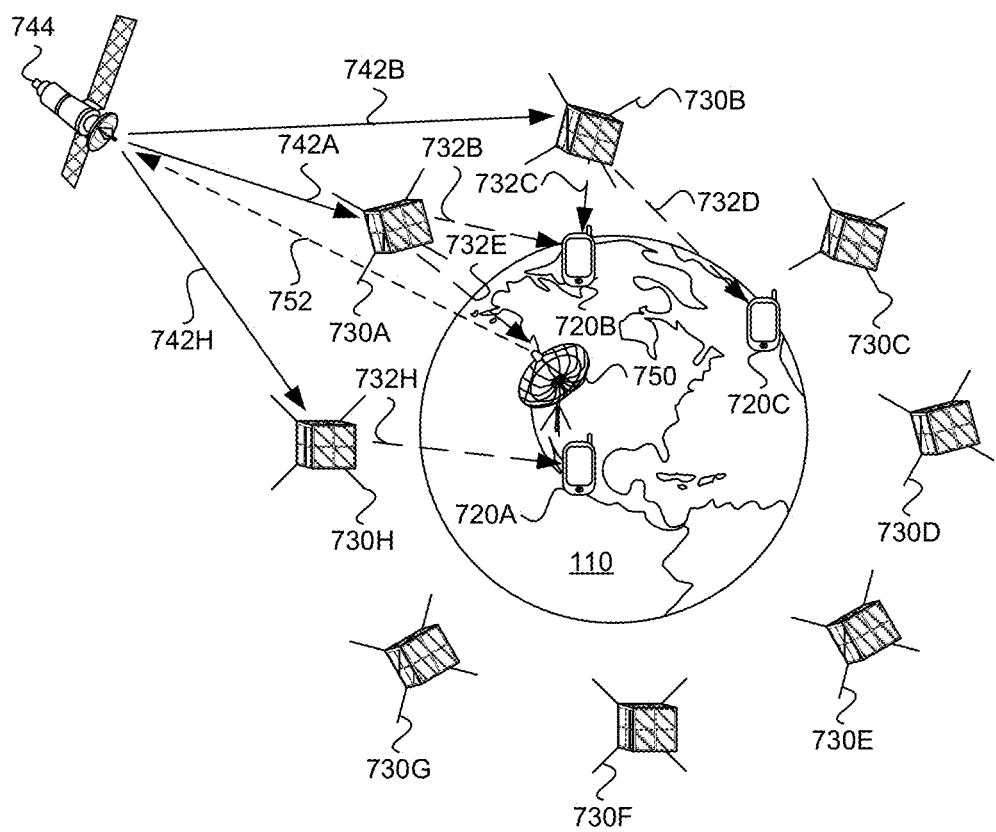
FIG. 14 illustrates a diagram of a high altitude satellite (HAS), a plurality of space location inertial navigation geopositioning system (SPACELINGS) satellites (SLS), a plurality of SPACELINGS end receivers (SER), and a ground station (GS) in accordance with an example.

FIG. 14 illustrates another example of a segment of SPACELINGS with ground sites or ground stations (GS) 750. The HAS 744 can function as a transponder (HAS-T) for the GS. The GS can generate at least one uplink PRN signal G1 752 on a different carrier frequency from H1 or H2 or a same carrier frequency as H1 or H2. The HAS-T can receive the uplink PRN signal G1 from the GS and transmit the downlink PRN signals H1 and/or H2 742A-B and 742H to the SLS. The HAS-T can transpond G1 on to at least one different carrier frequency (e.g., H1 and/or H2) 742A-B and 742H. The SLS 730 can receive the H1 and H2 signals and can transpond the H1 and H2 signals to a different carrier frequency TS1 to the SERs or the GS. The GS can receive the TS1 signal 732E and use the double Doppler shift of the TS1 to estimate the ephemeris of each SLS. G1 can encode the ephemeris data of the SLS platforms, the ephemeris of each HAS-T, and/or the location of each GS. In an embodiment, the GS can be networked with other ground stations and exchange the estimated SLS ephemerides and estimated HAS ephemerides.

The SER 720A-C can use the PRN signal to compute a super-duper range (a range with 3 separate signal transmission paths and 3 possible Doppler shifts), which can include the signal path from GS 750 to HAS-T 744 to SLS 730A-C to SER 720A-C. Using the encoded information and knowledge of the transponder delays the only unknown may be the range from SLS to SER. The component of the Doppler shift from SLS to SER can be extracted using the known transponder or frequency shifts and the ephemeris of the SLS and the HAS-T. The SER can use the range and Doppler time history from each SLS to estimate a SER position.

Figure 15:
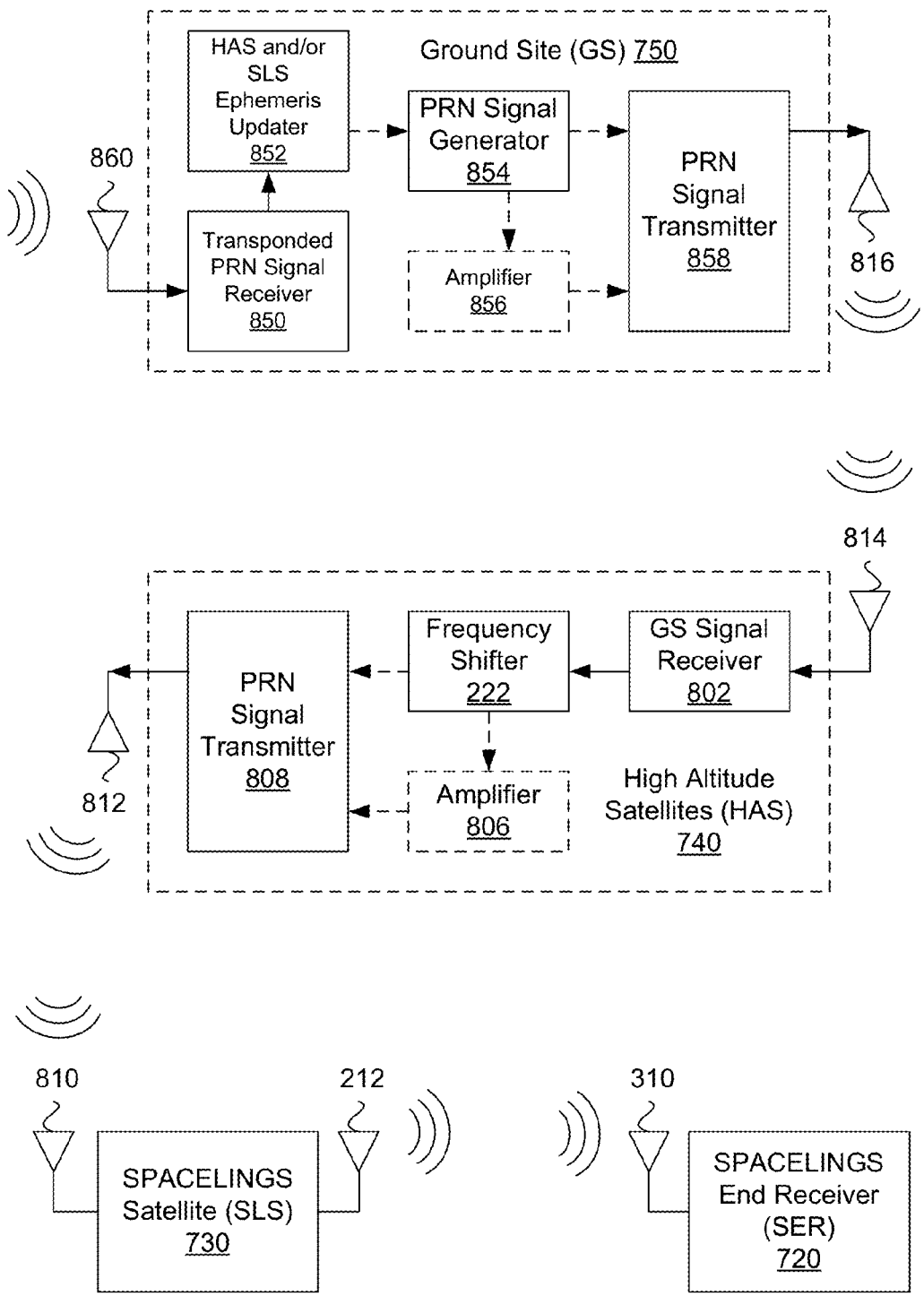
FIG. 15 illustrates a block diagram of a ground station (GS), a high altitude satellite (HAS), a space location inertial navigation geopositioning system (SPACELINGS) satellite (SLS), and a SPACELINGS end receiver (SER) in accordance with an example.

As illustrated in FIG. 15, the ground site (GS) 750 can include a PRN signal generator 854, a PRN signal transmitter 858, and at least one PRN transmitting antenna 816. The GS can also include a precise clock, like an atomic clock used for the PRN signal generation. The GPS signal generator can generate the G1 signal on specified frequency carrier, which can be transmitted on PRN signal transmitter via the at least one PRN transmitting antenna to the HAS-T. An amplifier 856 may be use to increase or boost the power of the downlink PRN signal.

In another embodiment, the GS 750 can include at least one PRN receiving antenna 860, a transponded PRN signal receiver 850, and a HAS and/or SLS ephemeris updater 852. The transponded PRN signal receiver can be configured to receive PRN or GPS signals such as TS1 from the SLS. The HAS and/or SLS ephemeris updater can be used to determine and refine a HAS ephemeris and/or a SLS ephemeris from the super-duper range embedded in the TS1 signal. In an example, the HAS and/or SLS ephemeris updater can use the methods and modules similar to those used in the SER to determine the HAS ephemeris and/or the SLS ephemeris. In an example, the ground station position or location can be known which can eliminate an unknown in the super-duper range calculations, so the HAS ephemeris and/or the SLS ephemeris may be determined with a single downlink PRN signal (e.g., H1 or H2). No clock bias may be used since the PRN signal received (e.g., TS1) by the GS originates at GS (e.g., G1) with Doppler shifts, where the same clock used for generation can be used for reception. The Doppler shift for a G1 signal path of the range may be very small. In another example, the HAS may be a GEO satellite, so the Doppler shift of the G1 signal path may be near zero or a known value (e.g., a correction term), since the GEO satellite is in a relatively constant position to the Earth.

In another configuration, the GS 750 can include the at least one PRN receiving antenna 860, the transponded PRN signal receiver 850, the HAS and/or SLS ephemeris updater 852, the signal generator 854, the PRN signal transmitter 858, and at least one PRN transmitting antenna 816. The HAS and/or SLS ephemeris determined by the HAS and/or SLS ephemeris updater can be used by the PRN signal generator to correct the HAS and/or SLS position information generated for the uplink PRN signal G1.

The high altitude satellite (HAS) 744 or HAS-T can include at least one GS receiving antenna 814, an uplink GS signal receiver 802, a frequency shifter 222, downlink PRN signal transmitter 808, at least one SLS transmitting antenna 812, and an optional amplifier 806. The HAS-T can relay the G1 signal from the GS as the H1 and/or H2 signal(s) to the SLS. The frequency shifter or the downlink PRN signal transmitter can generate the H1 and/or H2 signal(s) on different frequency carriers from the G1 signal. The amplifier may be use to increase or boost the power of the downlink PRN signal. The SLS 730 and SER 720 can operate in a manner similar to the SLS and SER previously described but using three signal paths instead of two signal paths.

The positional accuracy of the SER and the GS can depend on a number of SLS in view, a time to process, a starting knowledge of position, a SER velocity, and a SER acceleration. Once an initial SER position is established, a very fast convergence can occur to update the SER position.

The SER position can be initialized with various options, such as user input, a handover from a last GPS position, signals from two or more SLS, or extended time measurements with one SLS. In many cases, PRN signals from a single SLS can provide enough information to locate the position of the SER. When starting cold (e.g., without any initial position information), the SER may receive some data from two or more SLS (at least sequentially) depending on the acceleration of the SER and information provided by velocity sensors or INS data associated with the SER. Sequentially as used herein, means two satellites that are visible to the end receiver at the same time (simultaneously), even if just briefly, such as one satellite coming above the horizon while another satellite is setting behind the horizon. In an embodiment, the SER can include an inertial measurement unit (IMU), an inertial navigation system (INS), a motion sensor, an accelerometer, a magnetometer, a barometer, a rotation sensor, a gyroscope, wheel counters, odometers, or a combination of these sensors. The sensor may be used to provide initial position information of the SER and/or velocity or acceleration of the SER which can reduce the time for convergence on the SER position determination.

Figure 16:
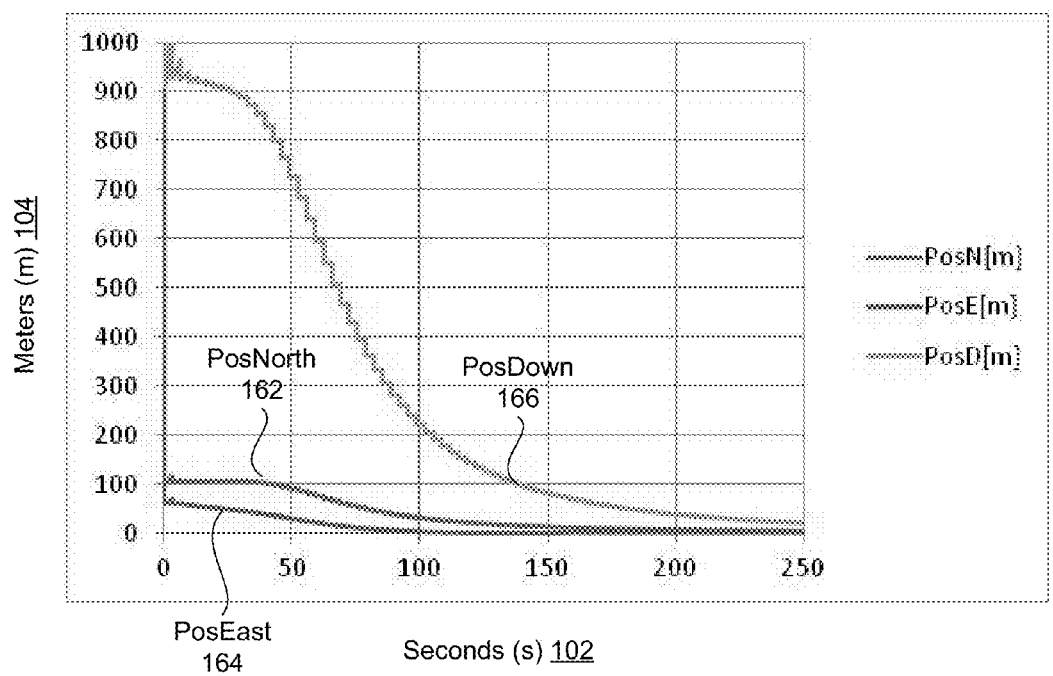
FIG. 16 illustrates a diagram of sample position error for the north, east, and down positions for a non-accelerating end receiver in accordance with an example.

FIG. 16 illustrates initial performance estimates showing three-dimensional (3-D) position errors limited by ephemeris errors and a less than 20 m root-means-square (RMS) per axis for North, East, and down positions for a non-accelerating receiver using PRN signals from a single SLS without initial position information. The position can be measured in meters 104 is determined over time (e.g., seconds 102). A vertical position, such as a down position (e.g., PosDown 166), can take longer to converge than a horizontal positions, such as a North-South position (e.g., PosNorth 162) and East-West position (e.g., PosEast 164). Unconstrained motion, such as an accelerating SER, can increase the time to converge on a position determination of the SER if the SER does not include sensor data or other information (e.g., additional SLS) to compensate for the unconstrained motion of the SER. Each constraint on motion such as motion at a known height, such as a ground vehicle, can reduce the time to converge on a position determination of the SER or reduce the number of SLS used to make the SER position determination.

Having a ground site receive and trend data from the HAS-T can improve the knowledge of the HAS ephemeris (e.g., HAS-T ephemeris) and reduce the time to convergence on the SER position determination.

In an embodiment, the space location inertial navigation geopositioning system (SPACELINGS) can restore and/or replace GPS-like capability without GPS satellites. The SPACELINGS can enables rapid 3-D determination of position for receivers in motion and at rest using signals from only one satellite (e.g., SLS), which determination may be achieved more rapid than GDAUG. The SPACELINGS can provide a low cost augmentation to the GPS service. The SPACELINGS can use very small LEO satellites, including CUBESATs, for a large constellation. In an embodiment, the SPACELINGS can use a small constellation of the more expensive HAS relative to the size of the LEO satellites. The SPACELINGS can have significant re-use of existing receiver hardware and techniques. The performance of SPACELINGS is scalable with size of the LEO satellites and HAS constellation. In an embodiment, most processing can be offloaded from the space segment of the SPACELINGS to the ground segment, where components can be cheaper and easier to maintain.

Various techniques, or certain aspects or portions thereof, may take the form of program code (i.e., instructions) embodied in tangible media, such as floppy diskettes, CD-ROMs, hard drives, non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, EPROM, flash drive, optical drive, magnetic hard drive, or other medium for storing electronic data. The base station and mobile station may also include a transceiver module, a counter module, a processing module, and/or a clock module or timer module. One or more programs that may implement or utilize the various techniques described herein may use an application programming interface (API), reusable controls, and the like. Such programs may be implemented in a high level procedural or object oriented programming language to communicate with a computer system. However, the program (s) may be implemented in assembly or machine language, if desired. In any case, the language may be a compiled or interpreted language, and combined with hardware implementations.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" means that a particular feature, structure, or characteristic described in connection with the example is included in at least one embodiment of the present invention. Thus, appearances of the phrases "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A global positioning system (GPS) and Doppler augmentation (GDAUG) end receiver (GDER), comprising:
    a GDAUG module, wherein the GDAUG module generates a GDER position using a time of flight (TOF) of a transponded GPS signal and a Doppler shift in a GDAUG satellite (GSAT) signal, and wherein the transponded GPS signal sent from a GSAT to the GDER comprises a frequency shifted copy of a GPS signal from a GPS satellite to the GSAT, and the GSAT signal comprises a signal generated by the GSAT to the GDER, wherein the GDAUG module further comprises:
    a Doppler shift module that measures a Doppler shift in the GSAT signal;
    a GSAT ephemeris estimator that determines a GSAT position by measuring a trend in a plurality of GSAT Doppler shift measurements from a plurality of GSAT signals;
    a range estimator that calculates a GSAT range from the GSAT position and a super-range measurement of the transponded GPS signal, wherein the super-range measurements represents a distance from the GPS to the GDER via the GSAT; and
    a receiver location estimator that estimates a GDER position using the GSAT position and the GSAT range.

2. The GDER of claim 1, wherein the Doppler shift module measures a Doppler shift in the transponded GPS signal, and the GSAT ephemeris estimator determines the GSAT position by extracting the Doppler shift due to the GSAT range from the Doppler shift of the transponded GPS signal to generate a Doppler shift of the GPS signal and by estimating the GSAT position using the Doppler shift of the GPS signal.

3. The GDER of claim 1, wherein the receiver location estimator trends a Doppler shift in a plurality of transponded GPS signals to generate a GDER position or a GDER velocity.

4. The GDER of claim 1, wherein the receiver location estimator further comprises an altimeter for determining an altitude of the GDER.

5. The GDER of claim 1, wherein the receiver location estimator further comprises at least one of a pedometer and an inertial measurement unit (IMU) for determining movement of the GDER.

6. The GDER of claim 1, wherein the GDAUG module is further configured to decode the transponded GPS signal to generate a super-range measurement, wherein the super-range measurement represents a distance from the GPS to the GDER via the GSAT.

7. The GDER of claim 1, wherein the GDAUG module is further configured for resetting the clock bias using a plurality of transponded GPS signals.

8. The GDER of claim 1, further comprising:
   a GDAUG signal receiver for receiving the plurality of transponded GPS signals and the GSAT signal;
   a signal despreader for demodulating the plurality of transponded GPS signals and detecting the GSAT signal.

9. The GDER of claim 8, wherein the signal despreader is further configured for extracting at least one of the time at a GPS satellite, a GPS satellite location, a GPS satellite identifier, and a GPS satellite ephemeris.

10. The GDER of claim 1, further comprising:
    a GPS receiver for receiving a GPS signal directly from a GPS satellite and for determining a global position using a plurality of GPS signals.

11. A method for global positioning using a global positioning system (GPS) and Doppler augmentation (GDAUG) end receiver (GDER), comprising:
    generating a GDER position using a time of flight (TOF) of a transponded GPS signal and a Doppler shift in a GDAUG satellite (GSAT) signal, wherein the transponded GPS signal sent from a GSAT to the GDER comprises a frequency shifted copy of a GPS signal from a GPS satellite to the GSAT, and the GSAT signal comprises a signal generated by the GSAT to the GDER, wherein generating the GDER position further comprises:
    generating a super-range measurement from the transponded GPS signal wherein the super-range measurement represents a distance from the GPS to the GDER via the GSAT;
    measuring a Doppler shift in the GSAT signal;
    determining a GSAT position by measuring a trend in a plurality of GSAT Doppler shift measurements from a plurality of GSAT signals;
    calculating a GSAT range from the GSAT position and the super-ranger measurement of the transponded GPS signal; and
    estimating a GDER position using the GSAT position and the GSAT range.

12. The method of claim 11, wherein determining the GSAT position further comprises measuring a Doppler shift in the transponded GPS signal, extracting the Doppler shift due to the GSAT range from the Doppler shift of the transponded GPS signal to generate a Doppler shift of the GPS signal, and estimating the GSAT position using the Doppler shift of the GPS signal.

13. The method of claim 11, wherein estimating the GDER position further comprises trending a Doppler shift in a plurality of transponded GPS signals to generate a GDER position or a GDER velocity.

14. A computer program product, comprising a non-transitory computer readable storage medium having a computer readable program code embodied therein, the computer readable program code adapted to be executed to implement the method of claim 11.

* * * * *